(12) United States Patent
Taki et al.

(10) Patent No.: US 7,224,712 B2
(45) Date of Patent: May 29, 2007

(54) INTERROGATOR AND TAG OF WIRELESS COMMUNICATION SYSTEM

(75) Inventors: Kazunari Taki, Nagoya (JP); Tsuyoshi Ohashi, Hashima (JP); Takuya Nagai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 840 days.

(21) Appl. No.: 10/400,519

(22) Filed: Mar. 28, 2003

(65) Prior Publication Data

US 2004/0150510 A1    Aug. 5, 2004

(30) Foreign Application Priority Data

Mar. 28, 2002 (JP) .............................. 2002-090121
Mar. 28, 2002 (JP) .............................. 2002-090428

(51) Int. Cl.
H04B 1/713 (2006.01)
(52) U.S. Cl. ..................... 375/132; 375/219; 455/3.01; 455/106
(58) Field of Classification Search ................ 375/130, 375/132, 146, 147, 219, 295, 316; 455/3.01, 455/91, 95, 100, 102, 103, 104
See application file for complete search history.

(56) References Cited

U.S. PATENT DOCUMENTS

| | | | | |
|---|---|---|---|---|
| 4,183,022 | A * | 1/1980 | Baudard et al. ............. | 342/174 |
| 4,206,462 | A * | 6/1980 | Rabow et al. ................ | 342/60 |
| 5,828,693 | A * | 10/1998 | Mays et al. .................. | 375/136 |
| 5,832,026 | A * | 11/1998 | Li ............................... | 375/136 |
| 5,842,118 | A * | 11/1998 | Wood, Jr. .................... | 455/101 |
| 5,940,006 | A | 8/1999 | MacLellan et al. | |
| 6,177,861 | B1 * | 1/2001 | MacLellan et al. ........ | 340/10.1 |
| 6,275,518 | B1 | 8/2001 | Takahashi et al. | |
| 6,356,230 | B1 * | 3/2002 | Greef et al. ................. | 342/127 |
| 6,650,695 | B1 * | 11/2003 | Girard ......................... | 375/219 |
| 6,658,044 | B1 * | 12/2003 | Cho et al. .................... | 375/135 |
| 2002/0175805 | A9 * | 11/2002 | Armstrong et al. ...... | 340/10.31 |
| 2004/0056091 | A1 * | 3/2004 | Overhultz et al. .......... | 235/382 |
| 2004/0109419 | A1 * | 6/2004 | Sano et al. .................. | 370/320 |

FOREIGN PATENT DOCUMENTS

| | | |
|---|---|---|
| EP | 0853392 A2 | 7/1998 |
| JP | A 7-226696 | 8/1995 |
| JP | A 8-204615 | 8/1996 |
| JP | A 9-307481 | 11/1997 |
| JP | A 10-41856 | 2/1998 |
| JP | A 10-229350 | 8/1998 |
| JP | A 11-355178 | 12/1999 |
| JP | A 2000-49656 | 2/2000 |
| JP | B2 3186989 | 5/2001 |

* cited by examiner

*Primary Examiner*—Pankaj Kumar
*Assistant Examiner*—Naheed Ejaz
(74) *Attorney, Agent, or Firm*—Oliff & Berridge, PLC.

(57) ABSTRACT

In a wireless communication system including at least one Interrogator and a plurality of Tags, the Interrogator transmits a main carrier signal, and each Tag transmits a reflected signal to the Interrogator in response to reception of the main carrier signal. The Tag Includes a receiving/reflecting system that receives the main carrier transmitted by the Interrogator and transmits the reflected signal to the Interrogator and a modulated subcarrier signal hopping system. The modulated subcarrier signal hopping system is provided with a frequency hopping system that applies frequency hopping to a subcarrier signal, and a subcarrier signal modulating system that modulates the subcarrier signal with a predetermined information signal. The Tag further includes a main carrier modulating system that modulates the main carrier received through the receiving/reflecting system with the modulated subcarrier signal, the modulated main carrier signal being transmitted to the Interrogator through the receiving/reflecting system as the reflected signal.

22 Claims, 22 Drawing Sheets

INTERROGATOR AND TAG OF WIRELESS COMMUNICATION SYSTEM

BACKGROUND OF THE INVENTION

The present invention relates to an Interrogator and Tags of a wireless communication system in which the Interrogator transmits a carrier signal to the Tags, each of which modulates the received carrier signal and reflects the modulated signal to the Interrogator.

Conventionally, a communicating system configured such that an Interrogator which transmits a main carrier signal to one or more Tags and each of the Tags modulates the main carrier signal with a subcarrier signal and reflects the thus modulated carrier signal to the Interrogator has been known. An Example of such a communication system is disclosed in EP 0 853 392 A2, teachings of which are incorporated herein by reference. In this publication, by employing a frequency dividing multiple access method using a plurality of subcarrier signals, communication with the plurality of Tags is processed.

However, if the number of the Tags are relatively large, it is difficult to use different subcarrier frequencies for respective Tags, and the possibility of occurrence of a so-called "collision" is relatively large. It may be possible to configure the Tags to change the subcarrier frequency. However, even in such a case, each Tags cannot identify which subcarrier frequencies are used by other Tags, and therefore, the collision may still occur.

Further, the power sources of the Tags are generally small due to their structures, and thus the power supplied thereto is relatively small.

Furthermore, if there are a plurality of Interrogators, the frequency of the main carrier signal may be changed according to the conventional communication system. However, the Tags typically do not have selectivity for frequencies. Therefore, unexpected Tags as well as the intended Tags may reflect the modulated carrier signals, and the possibility of the collision may increase in such a system.

SUMMARY OF THE INVENTION

The present invention is advantageous in that a communication system is provided, in which one or a plurality of Interrogators are capable of identifying a plurality of Tags substantially simultaneously.

The present invention is also advantageous in that a communication system having high frequency usage efficiency can be provided. Further, the invention is advantageous in that a communication system having power-saved Tags can be provided.

According to an aspect of the invention there is provided a Tag for a wireless communication system including at least one Interrogator, the Interrogator transmitting a main carrier signal, the Tag transmitting a reflected signal to the Interrogator in response to reception of the main carrier signal, the Tag includes a receiving/reflecting system that receives the main carrier transmitted by the Interrogator and transmits the reflected signal to the Interrogator and a modulated subcarrier signal hopping system. The modulated subcarrier signal hopping system is provided with a frequency hopping system that applies frequency hopping to a subcarrier signal, and a subcarrier signal modulating system that modulates the subcarrier signal with a predetermined information signal.

The Tag further includes a main carrier modulating system that modulates the main carrier received through the receiving/reflecting system with the modulated subcarrier signal modulated by the subcarrier signal modulating system, the modulated main carrier being transmitted to the Interrogator through the receiving/reflecting system as the reflected signal.

Optionally, a minimum frequency of the subcarrier signal is greater than a hopping frequency interval of the subcarrier signal hopped by the frequency hopping system.

Further optionally, an interval of a plurality of main carrier signals that are transmitted by the at least one Interrogator is greater than twice a maximum hopping frequency of the subcarrier signal hopped by the frequency hopping system.

In a particular case, all the frequency band of frequency-hopped subcarrier signals used for modulating a first main carrier signal and all the frequency band of frequency-hopped subcarrier signals used for modulating a second main carrier are at least partially overlapped, and each of the frequency-hopped subcarrier signals used for modulating the first main carrier signal and each of the frequency-hopped subcarrier signals used for modulating the second main carrier are frequency-arranged in accordance with an interleaving relationship.

Further optionally, an interval of a plurality of main carrier signals transmitted by the at least one Interrogator is a sum of a maximum hopping frequency of frequency-hopped subcarrier signals and a minimum hopping frequency of the frequency-hopped subcarrier signals and a half of an interval of hopping frequencies of the subcarrier signals hopped by the frequency hopping system.

Furthermore, a primary side band generated by modulating a first main carrier signal with the subcarrier signal and a secondary side band generated by modulating a second main carrier signal with the subcarrier signal do not collide with each other, and a minimum hopping frequency, a maximum hopping frequency and a hopping frequency interval of the subcarrier signals which is frequency-hopped by the frequency hopping system, and a frequency interval of first and second main carriers of the at least one Interrogator are determined such that the primary side band, the secondary side band and a side band generated by the first and second main carrier signals do not collide with each other.

Optionally, an interval between a plurality of main carrier signals transmitted by the at least one Interrogator may be equal to maximum hopping frequency and minimum hopping frequency of the frequency-hopped subcarrier signals frequency-hopped by the frequency hopping system, one of hopping patterns which are chronologically symmetric being used for frequency hopping. In this case, by overlaying the frequencies, the frequency usage efficiency can be improved.

Optionally, the Tag is further provided with a hopping pattern determining system that determines a hopping pattern for the subcarrier signal in accordance with identification information of the Interrogator, and a starting phase determining system that determines a starting phase of the hopping to be used for frequency hopping the subcarrier signal in accordance with the identification information of the Interrogator.

The Tag may further include an oscillator used to apply the frequency hopping to the subcarrier signal, and a subcarrier signal modulator that varies one of phase, frequency and amplitude of a signal generated by the oscillator in accordance with a predetermined information signal. The oscillator may be a numerical control oscillator.

According to a further aspect of the invention, the Interrogator includes a transmitting system that transmits the main carrier signal, a reflected signal receiving system that receives a reflected signal, each of the Tags generating the reflected signal by modulating the main carrier transmitted from the Interrogator and received by the Tags, a demodulating system that demodulates the reflected signal received by the reflected signal receiving system to output a demodulated signal, and a data detection system that detects data from the demodulating signal. With this configuration, the demodulating system simultaneously receives signals within a predetermined band including all the hopping frequency ranges defined by minimum hopping frequency and maximum hopping frequency of a subcarrier signal and applies demodulation to the received signals. Further, the data detection system is provided with a band dividing system that divides the demodulated signal into a plurality of bands to generate a divided band signal for each of the plurality of bands where each band contains each subcarrier frequency, a decoding system that decodes the divided band signal to obtain data for each of the plurality of bands, a sorting system that extracts frames from the divided band signals and sorts the extracted frames in accordance with a predetermined condition, and a connecting system that connects the sorted frames chronologically.

Optionally, the band dividing system includes an A/D converting system that converts the demodulated signals into a series of digital values to obtain digitalized demodulated signals, a frequency domain converting system that converts the time-domain digitalized demodulated signal into frequency domain signals and a hopping band dividing system that divides the frequency domain signals by predetermined hopping frequency bands. Thus, conversion to the frequency domain, band division and the like can be done by a numerical procedure using a DSP (Digital Signal Processor) and the like.

Still optionally, the demodulating system of the Interrogator further includes a time domain converting system that applies an inverse conversion to the signals divided by the predetermined hopping frequency bands to obtain time domain signals.

According to a further aspect of the invention, the Interrogator further including a collision detector that detects a collision as a plurality of Tags reply using the same subcarrier frequency, and a collision subcarrier signal notifying system that notifies the frequency of the subcarrier signal causing the collision if the collision detector detects the collision.

Optionally, the Tag includes a receiving/reflecting system that receives the main carrier transmitted by the Interrogator and transmits the reflected signal to the Interrogator and a modulated subcarrier signal hopping system. The modulated subcarrier signal hopping system is provided with a frequency hopping system that applies frequency hopping to a subcarrier signal, and a subcarrier signal modulating system that modulates the subcarrier signal with a predetermined information signal.

Further, the Tag includes a main carrier modulating system that modulates the main carrier received through the receiving/reflecting system with the modulated subcarrier signal modulated by the subcarrier signal modulating system, the modulated main carrier being transmitted to the Interrogator through the receiving/reflecting system as the reflected signal.

According to a further aspect of the invention, in the Tag configured as above, the frequency hopping system is capable of applying the frequency hopping to the subcarrier signal with a plurality of hopping frequency intervals, and the Tag further includes a hopping frequency interval selecting system that selects one of the plurality of hopping frequency intervals.

According to the third embodiment, the hopping frequency selecting system selects a hopping frequency interval that is narrower than a predetermined width in an area where the subcarrier signal has a low frequency, and the hopping frequency interval selecting system selects a hopping frequency interval that is wider than a predetermined width in an area where the subcarrier signal has a high frequency.

Optionally the hopping frequency interval selecting system selects a predetermined hopping frequency interval from among a plurality of hopping frequency intervals based on an amount of data to be transmitted.

Further optionally, the hopping frequency interval selecting system selects a hopping frequency interval that is narrower than a predetermined width when a data rate of data to be transmitted is low, and the hopping frequency interval selecting system selects a hopping frequency interval that is wider than a predetermined width when a data rate of data to be transmitted is high.

Further optionally, the Tag further includes a power supply condition detecting system that detects a power supply condition. The hopping frequency interval selecting system then selects a hopping frequency interval based on the power supply condition detected by the power supply condition detecting system.

In particular, if the supplied power is lowered, an operation mode can be set to a power save mode by narrowing the subcarrier signal hopping frequency interval. That is, the hopping frequency interval selecting system selects a hopping frequency interval narrower than a predetermined interval if the power supply condition detecting system detects that the power supply condition is worse than a predetermined condition.

Still optionally, the Tag further includes a hopping frequency interval control system that controls the hopping frequency interval selecting system to initially selects a hopping frequency interval narrower than a predetermined interval, the hopping frequency interval control system controlling the hopping frequency interval selecting system to select a hopping frequency interval wider than the predetermined interval if the Tag receives a data transmission request from the Interrogator.

Still optionally, the Interrogator includes a reflected signal receiving system that receives a reflected signal, each of the Tags generating the reflected signal by modulating the main carrier transmitted from the Interrogator and received by the Tags, a demodulating system that demodulates the reflected signal received by the reflected signal receiving system to output a demodulated signal, a data detection system that detects a data signal from the demodulating signal a reception control system that controls the reflected signal receiving system to received a reflected signal modulated with a subcarrier signal having a hopping frequency interval narrower than a predetermined interval in a normal state, and an identification information judging system that judges identification information of the Tag in accordance with the data signal detected by the data detection system. With this configuration, if the identification information judging system judges the identification information of the Tag, the reception control system controls the reflected signal receiving system to receive reflected signals modulated using the all ranges of hopping frequency intervals.

Further, the Interrogator includes a reflected signal receiving system that receives a reflected signal, each of the Tags generating the reflected signal by modulating the main carrier transmitted from the Interrogator and received by the Tags, a demodulating system that demodulates the reflected signal received by the reflected signal receiving system to output a demodulated signal a data detection system that detects a data signal from the demodulating signal, a demodulation control system that controls the demodulating system to demodulate a reflected signal modulated with a subcarrier signal having a hopping frequency interval narrower than a predetermined interval in a normal state, and an identification information judging system that judges identification information of the Tag in accordance with the data signal detected by the data detection system. If the identification information judging system judges the identification information of the Tag, the demodulation control system controls the demodulating system to demodulate reflected signals modulated using the all ranges of hopping frequency intervals.

BRIEF DESCRIPTION OF THE ACCOMPANYING DRAWINGS

Figure 1:
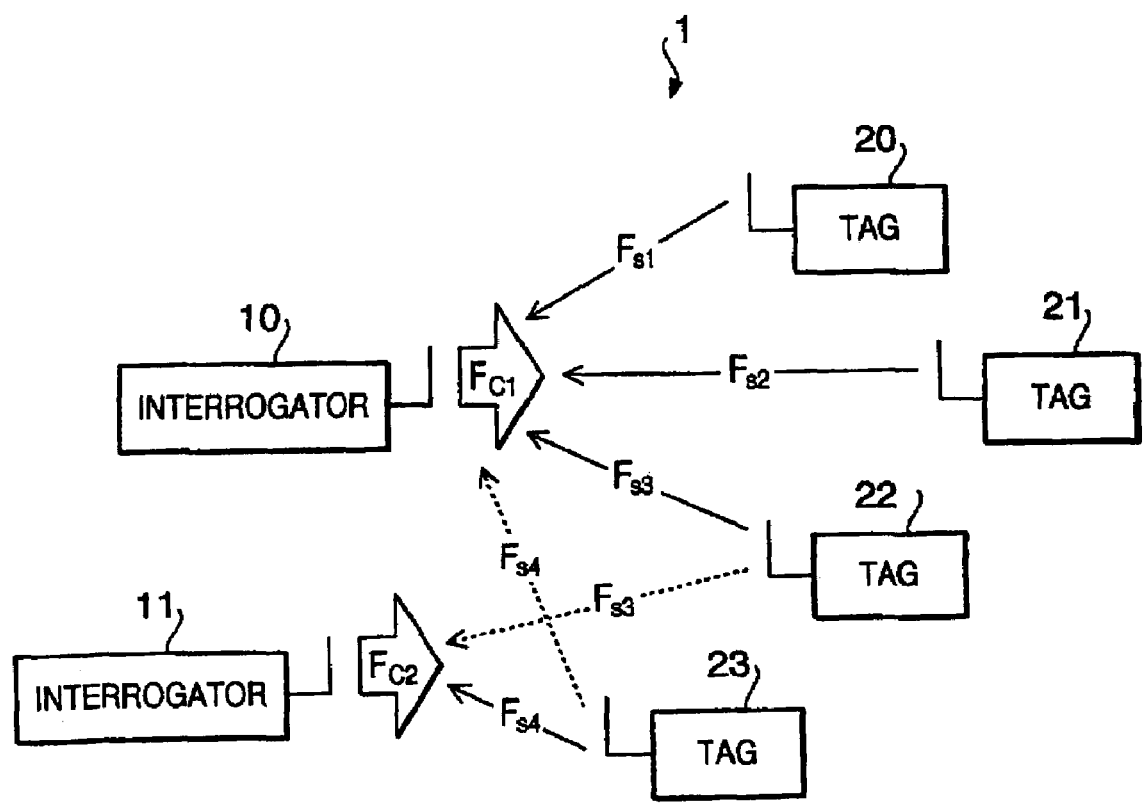
FIG. 1 shows an illustrative configuration of a communication system according to a first embodiment.
Figure 8:
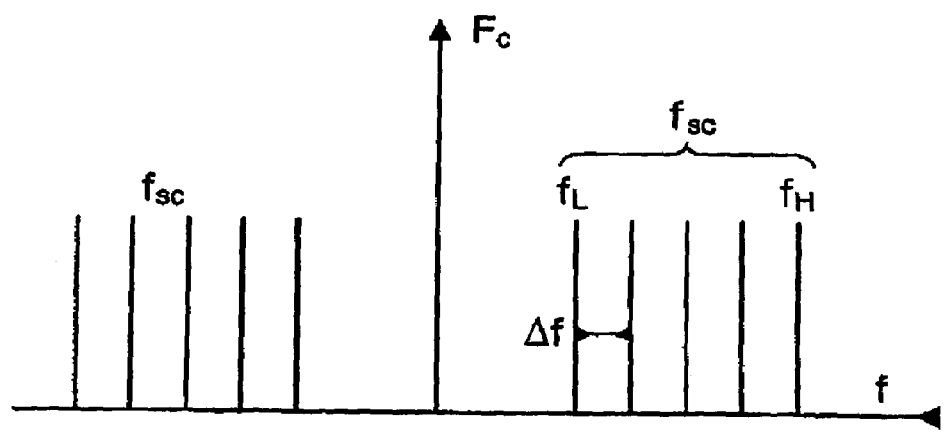
Figure 9:
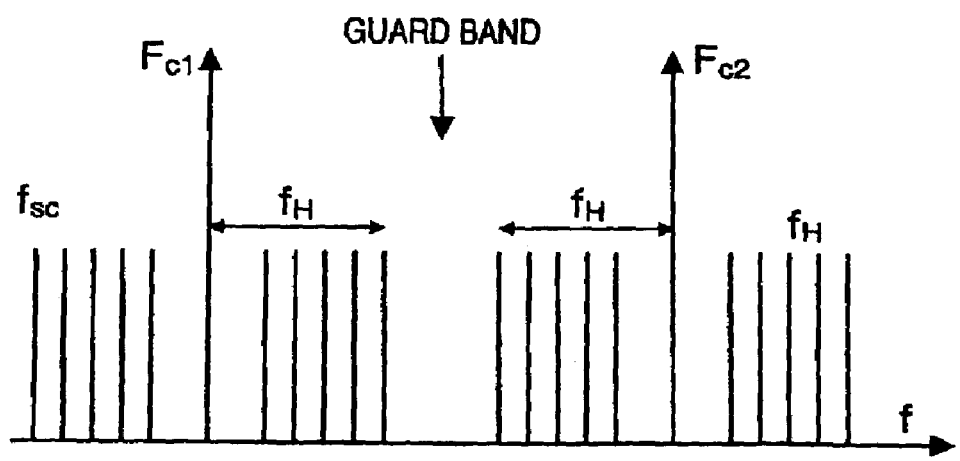
Figure 10:
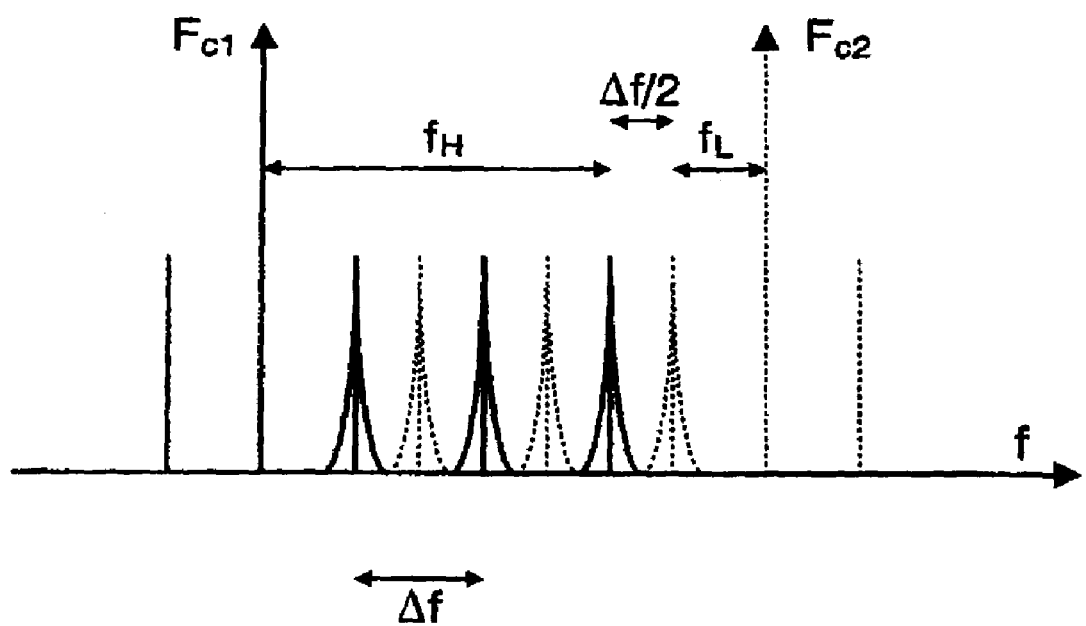
Figure 11:
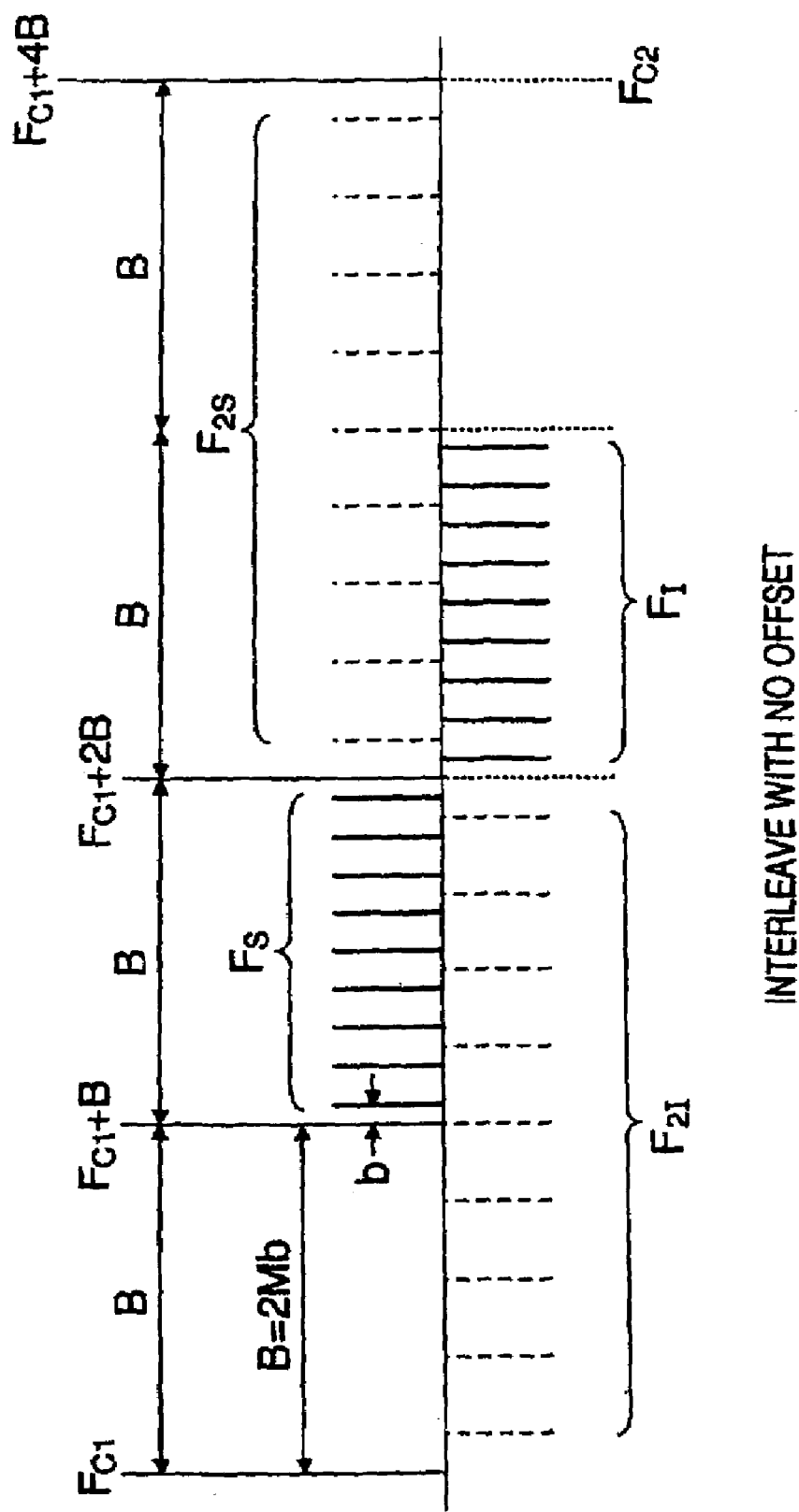
Figure 12:
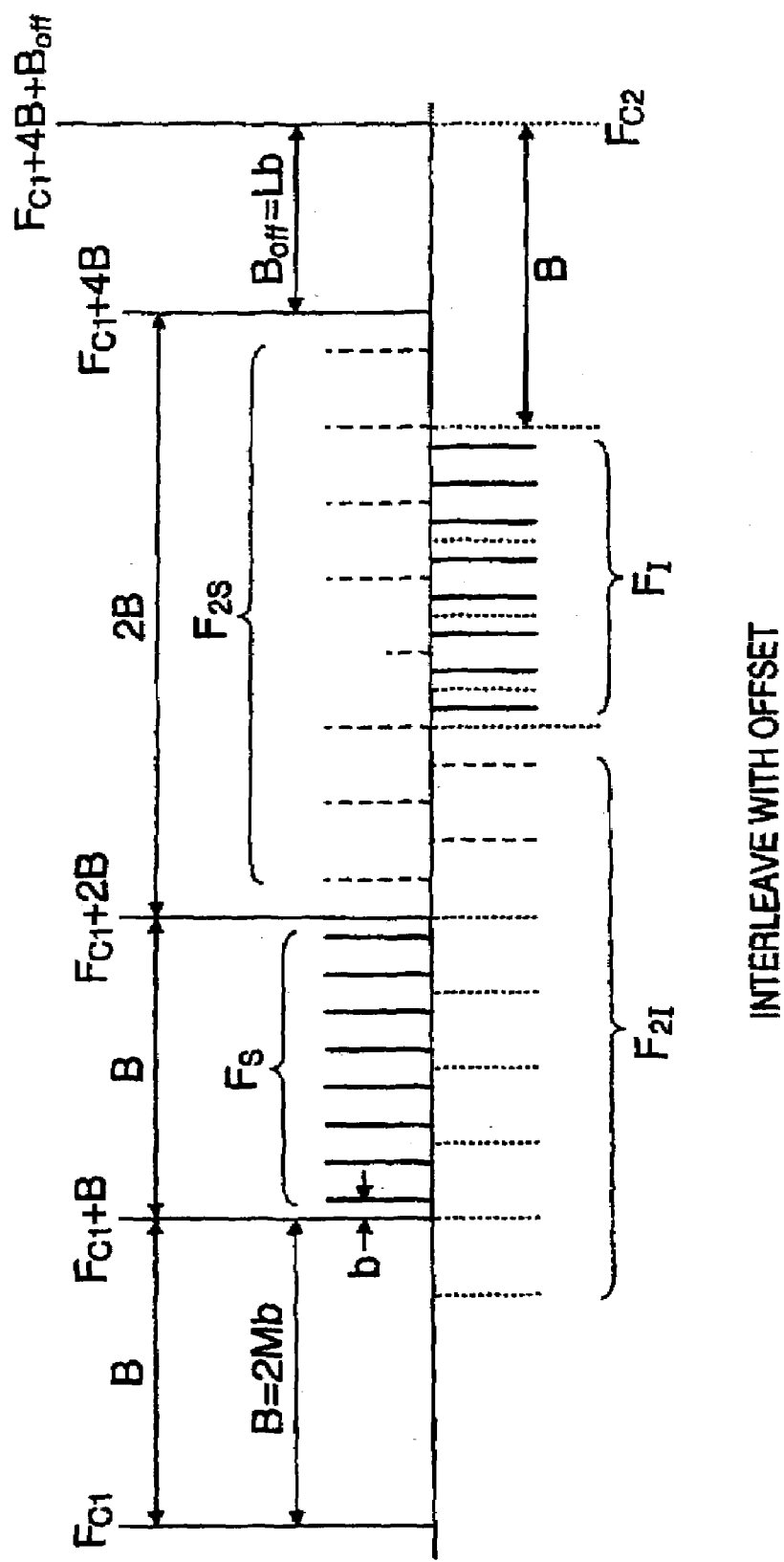
Figure 13:
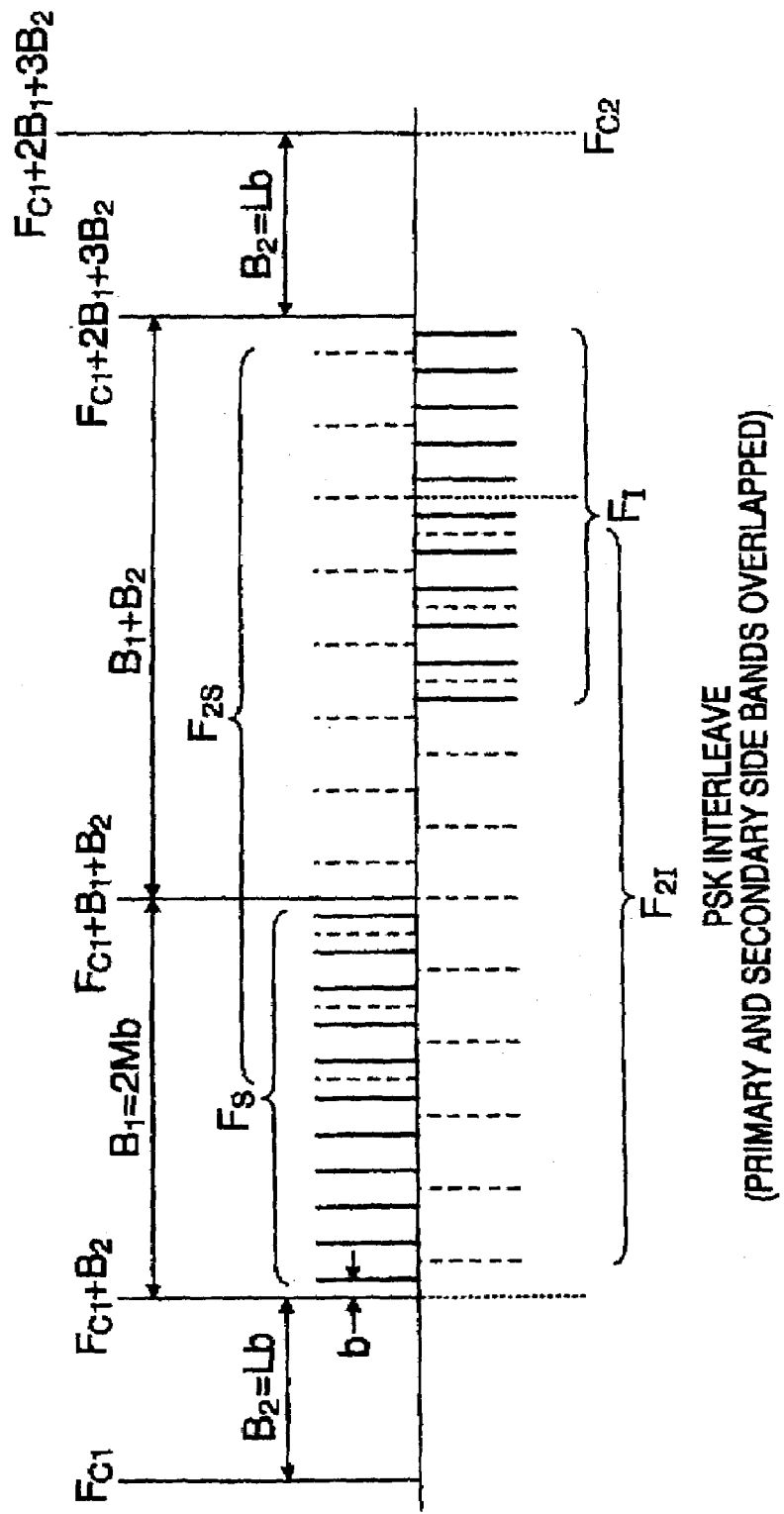
Figure 14:
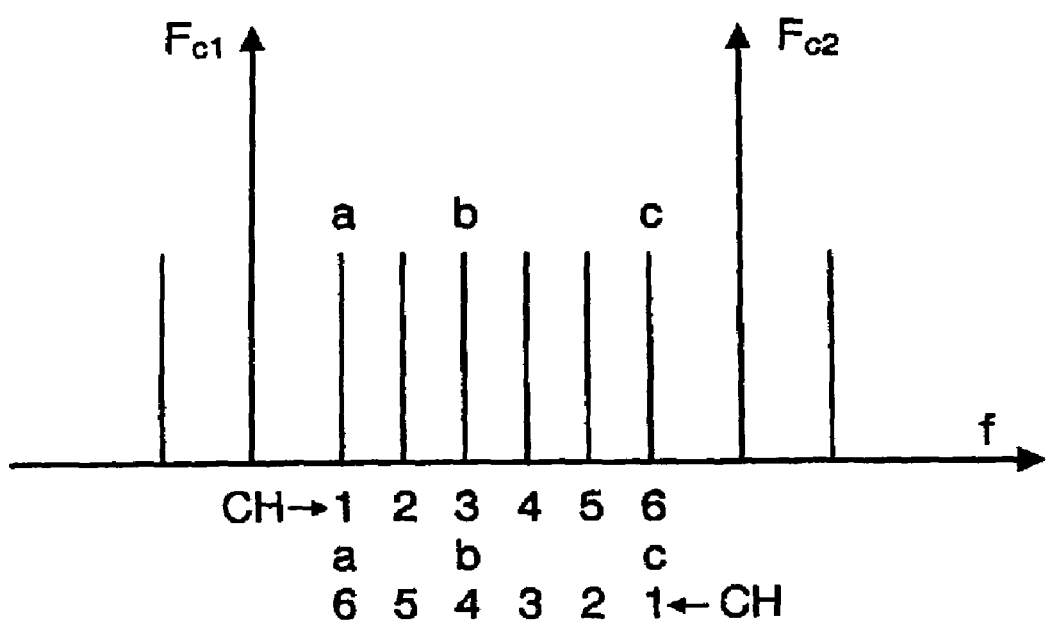
Figure 15:
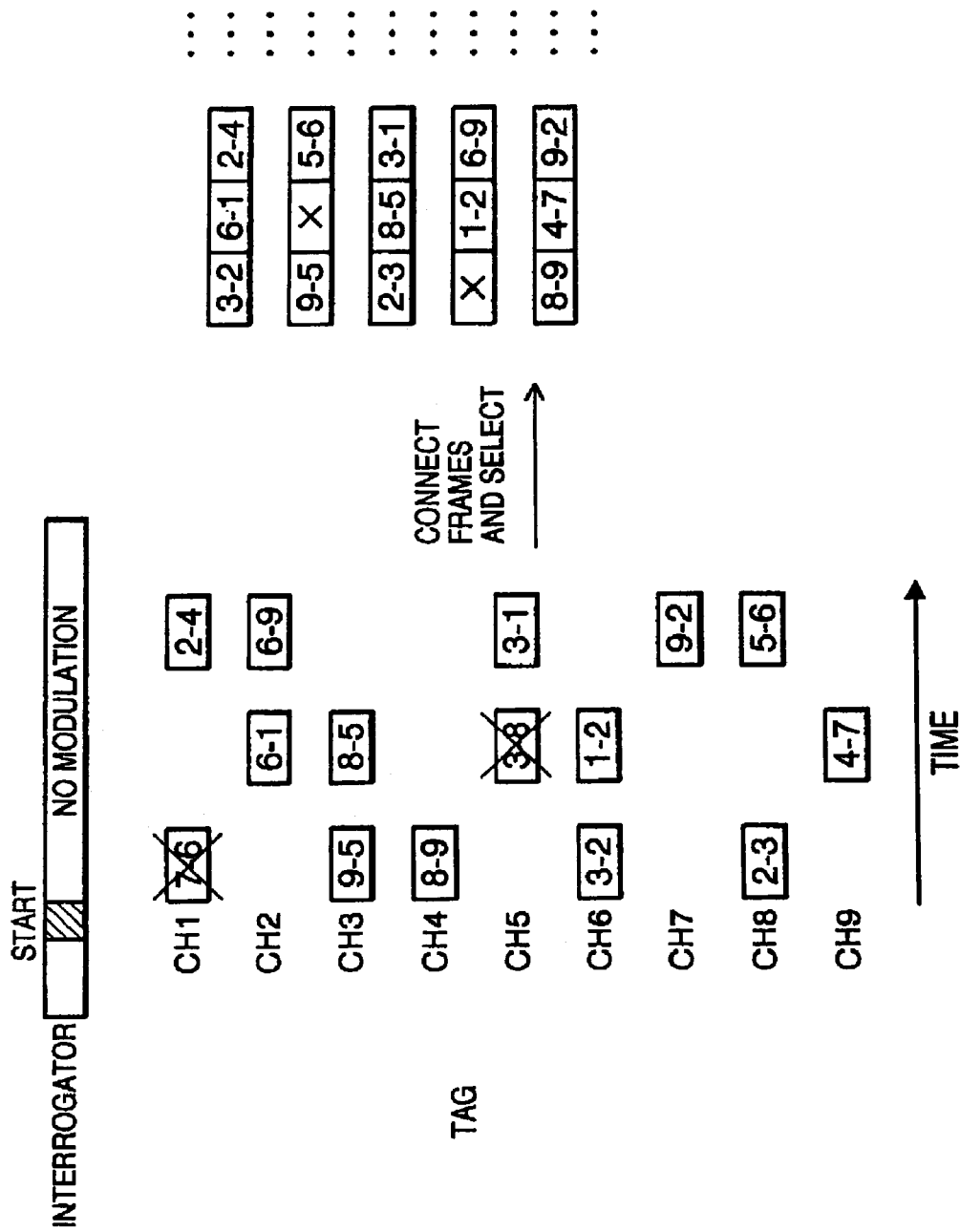
Figure 16:
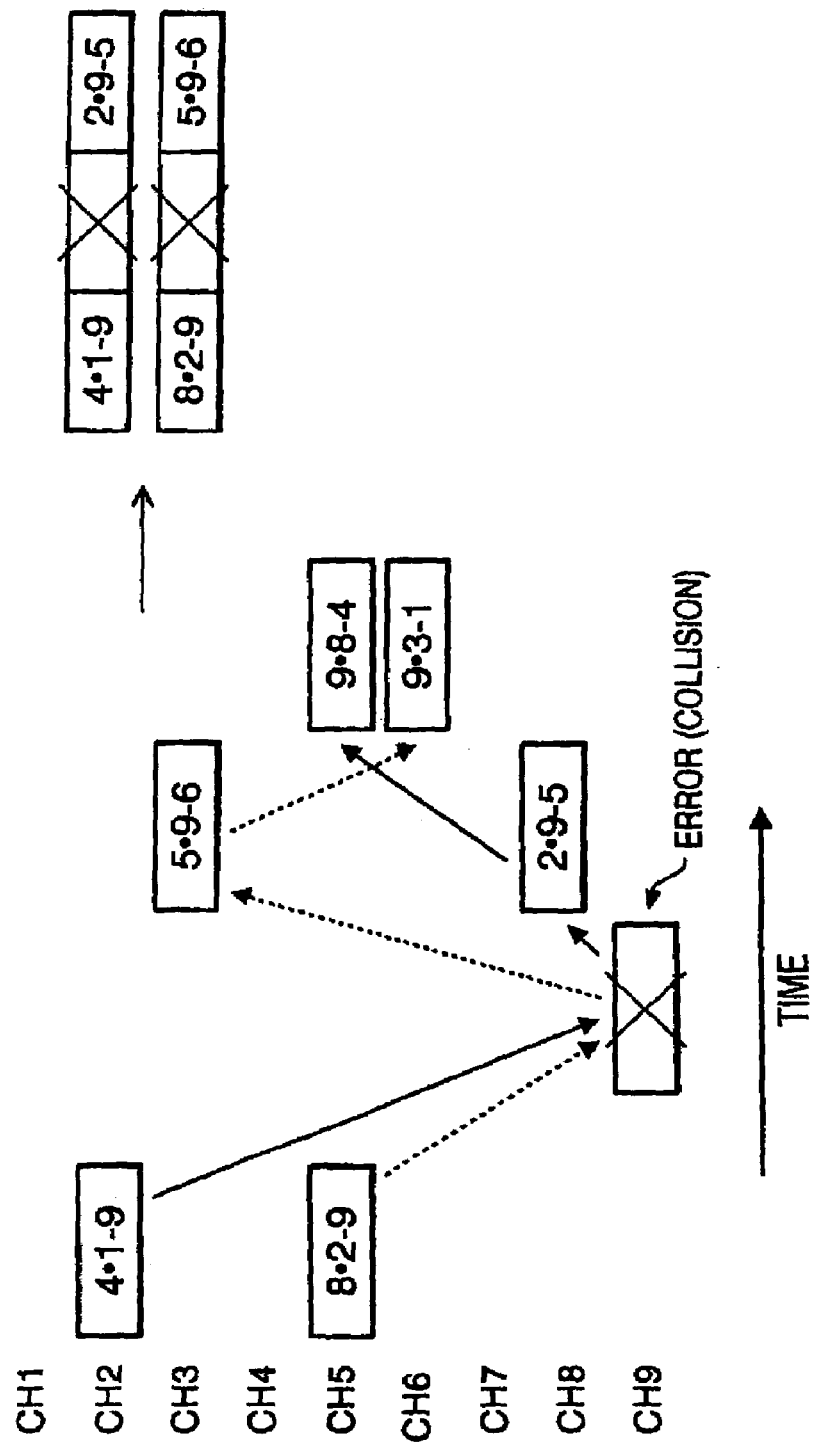
Figure 17:
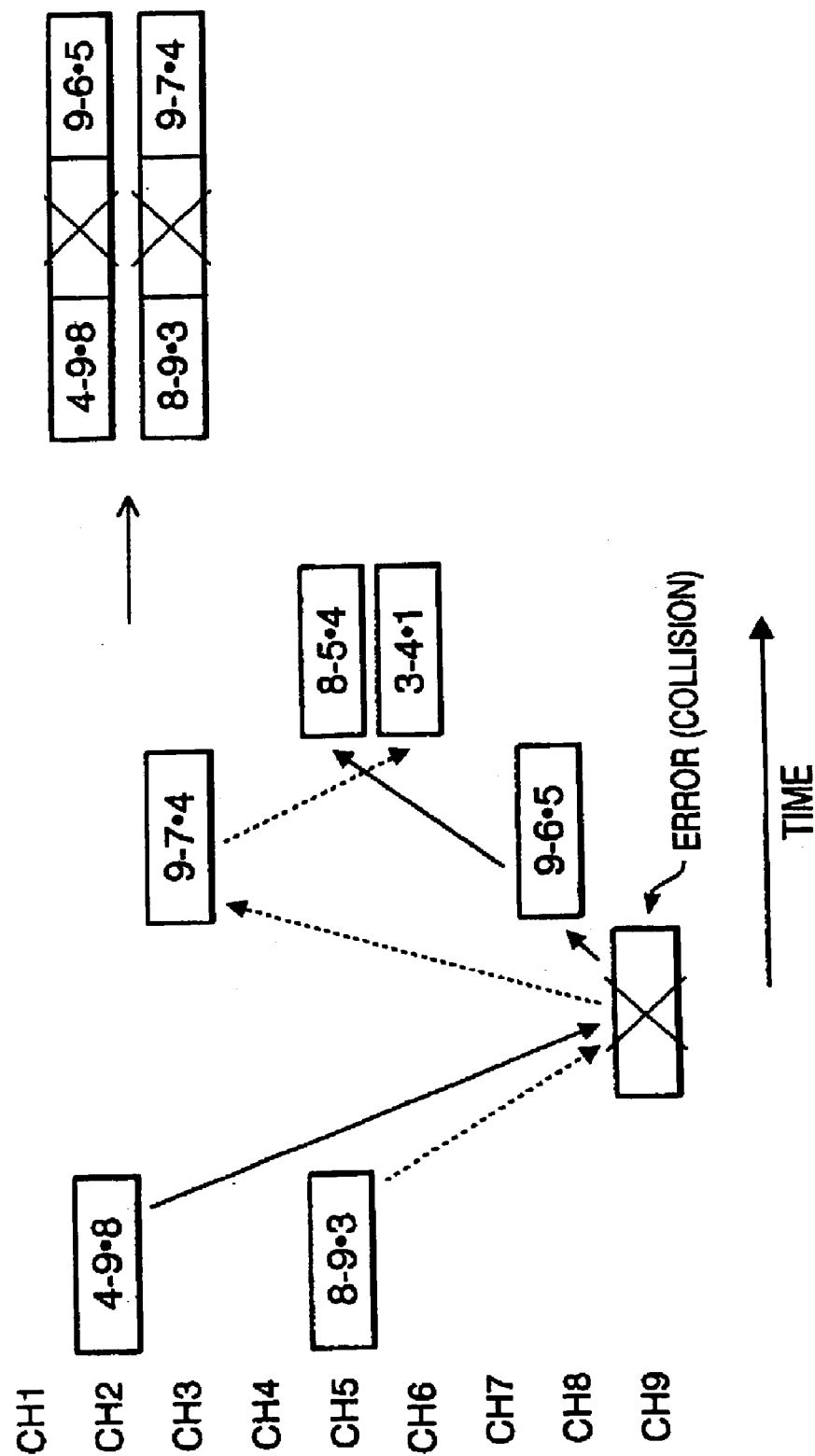
Figure 18:
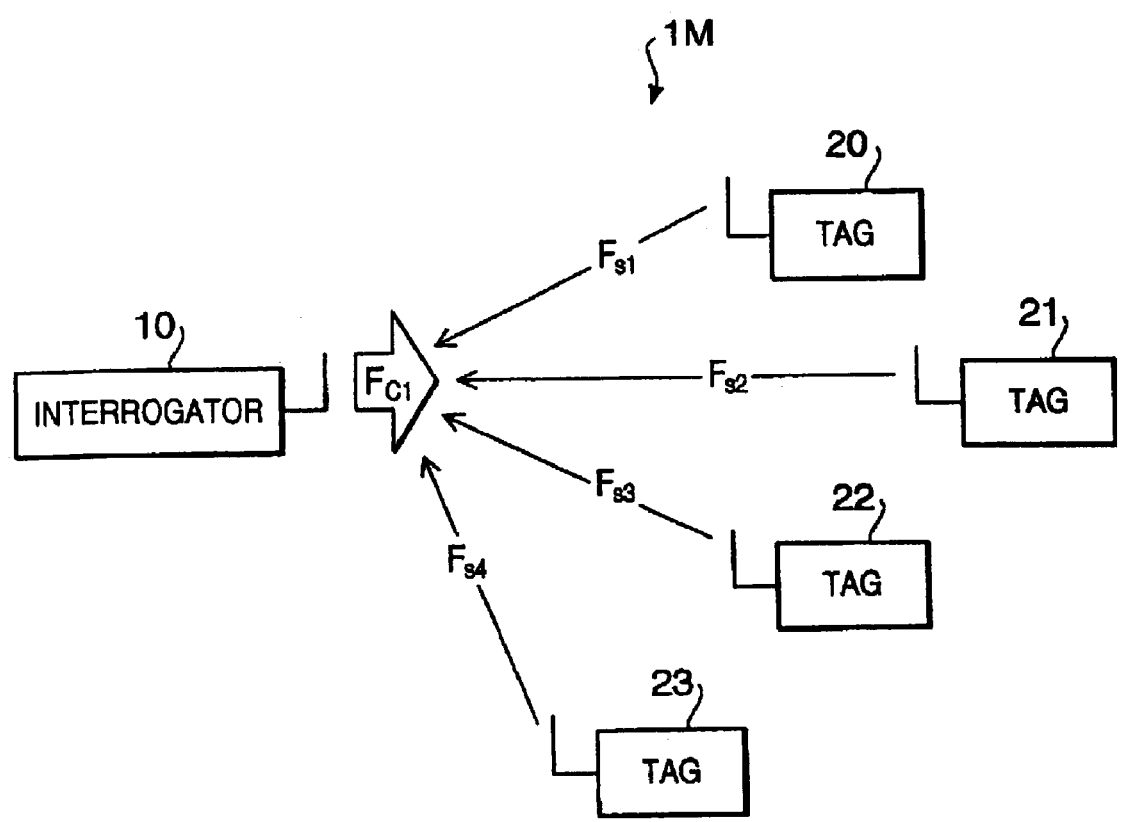
Figure 19:
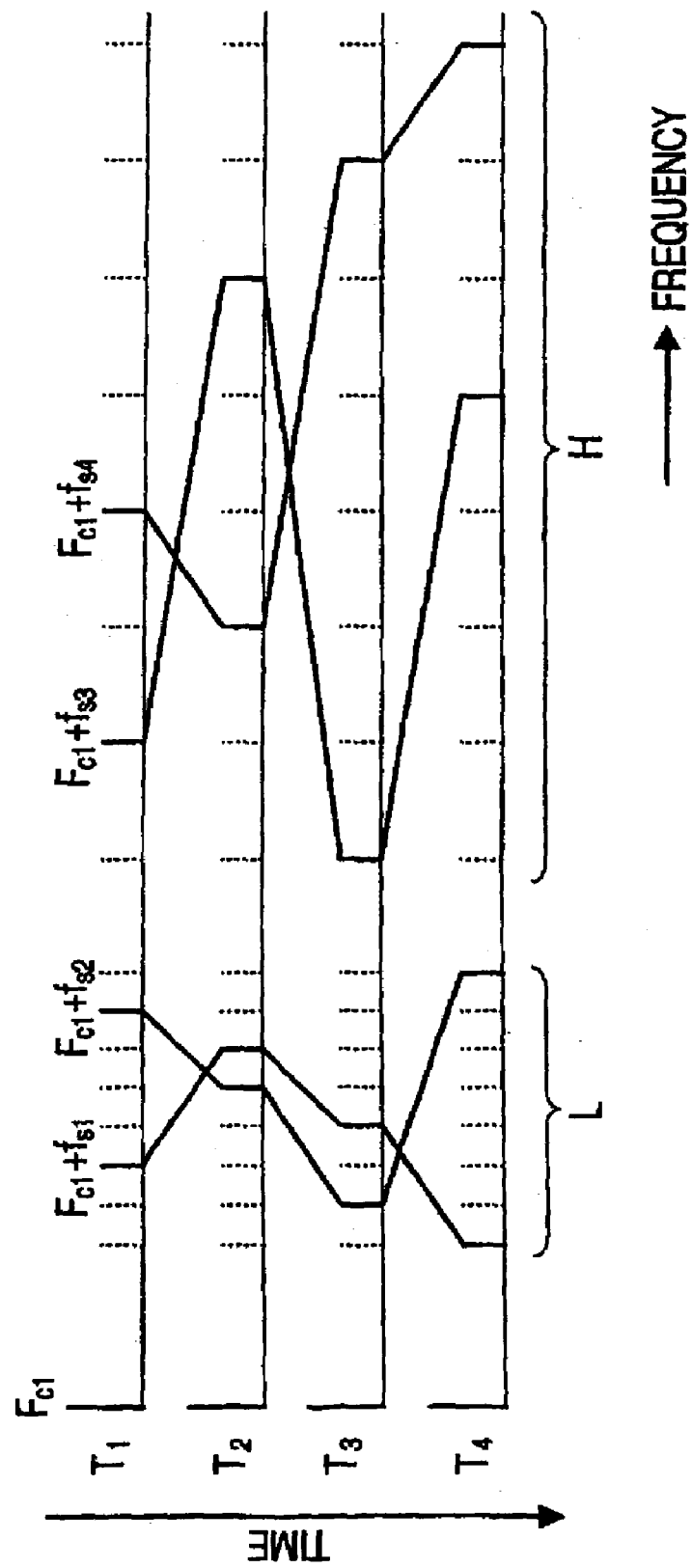
Figure 21:
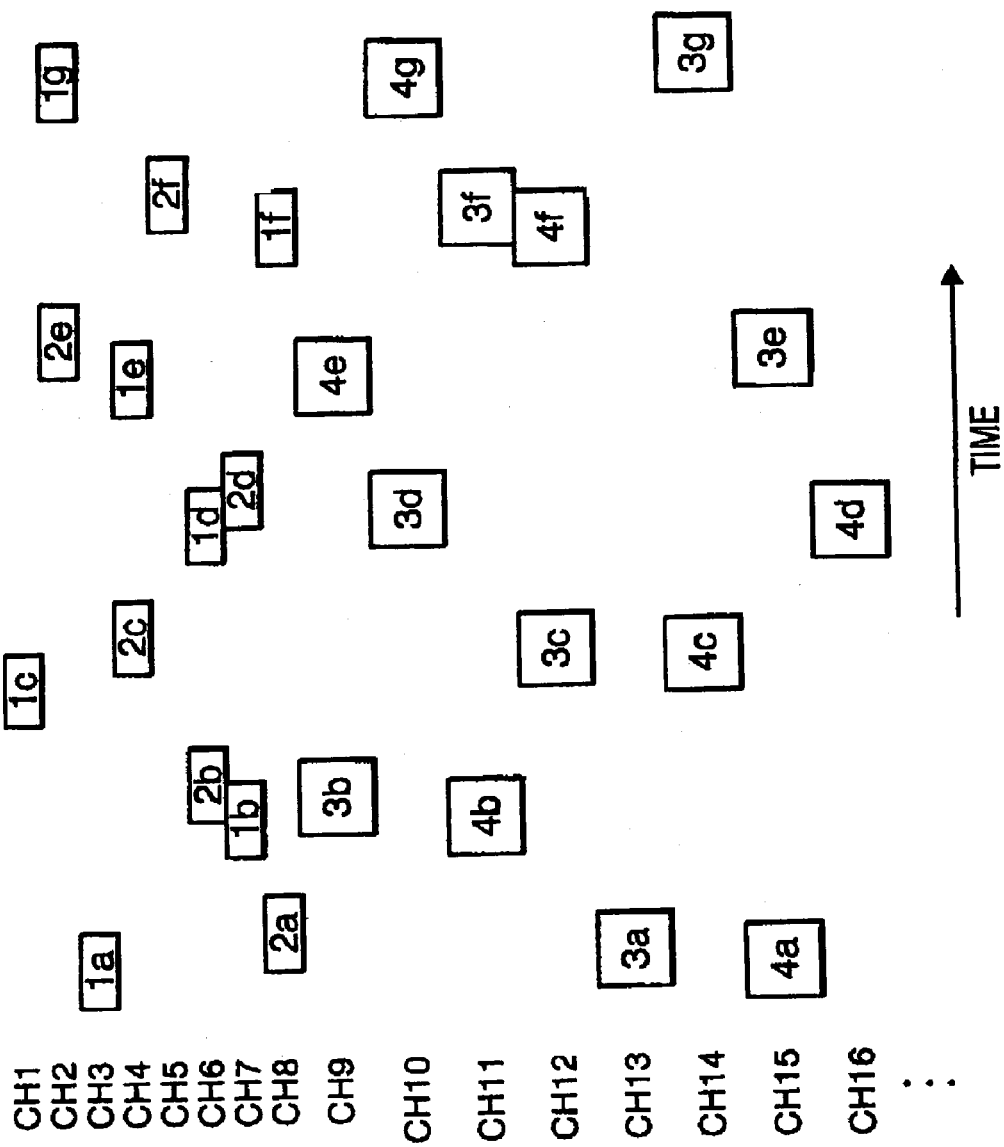
Figure 22:
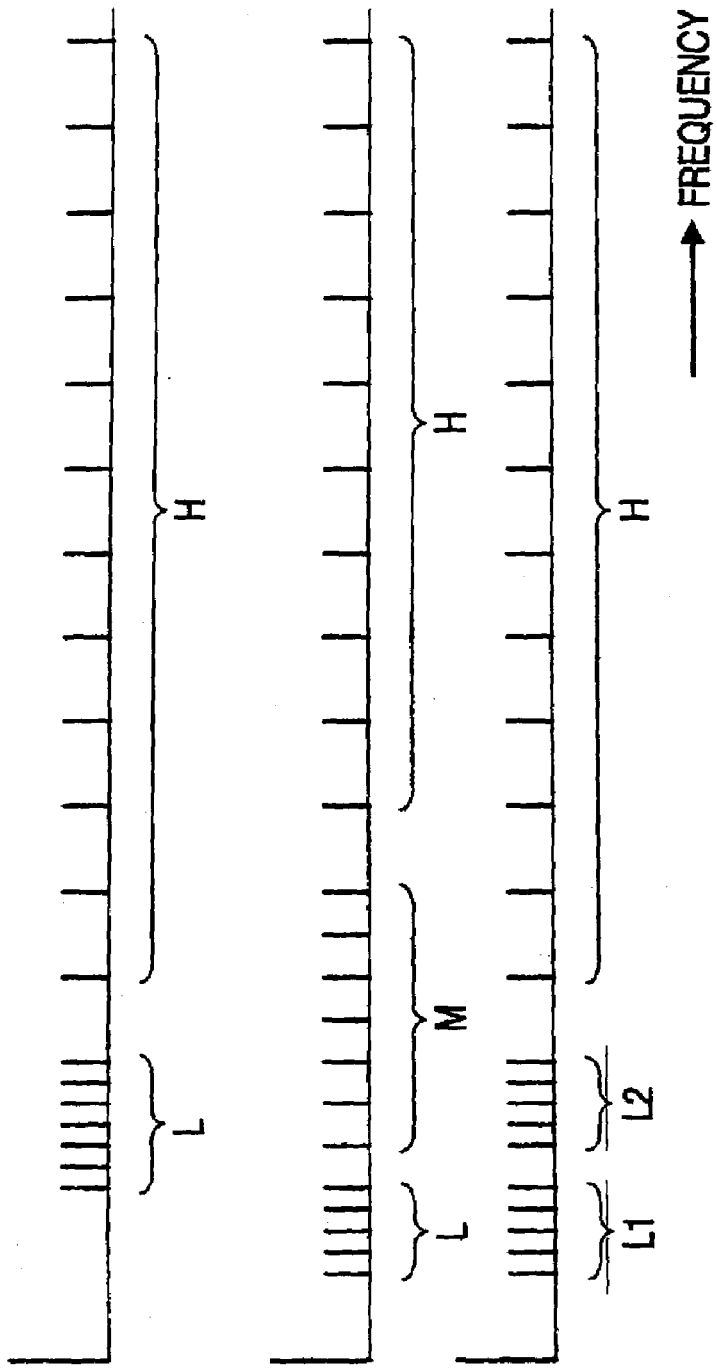
Figure 23:
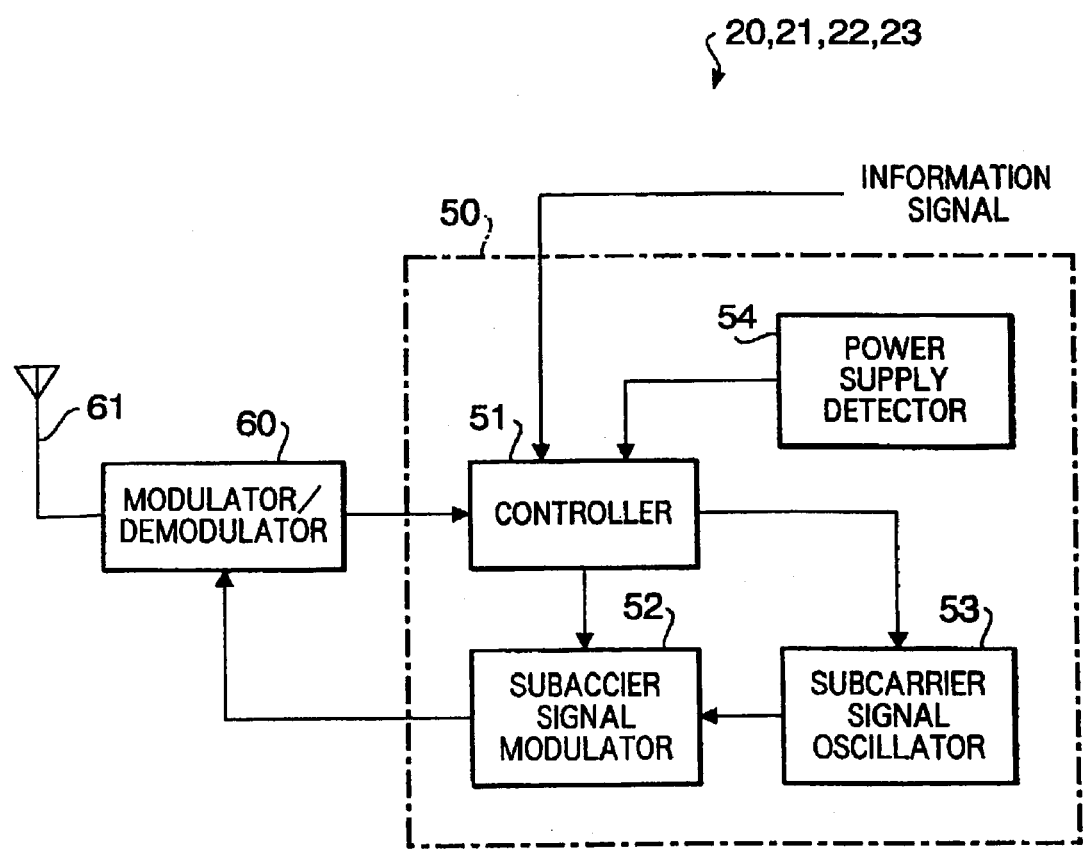

FIG. 8 indicates maximum and minimum hopping frequencies of the subcarrier signals, a frequency interval, a hopping frequency interval and a frequency interval between main carrier signals;

FIG. 9 indicates maximum and minimum hopping frequencies of the subcarrier signals, a frequency interval, a hopping frequency interval and a frequency interval between main carrier signals in accordance with a guard band method:

FIG. 10 indicates maximum and minimum hopping frequencies of the subcarrier signals, a frequency interval, a hopping frequency interval and a frequency interval between main carrier signals in accordance with an interleave method;

FIG. 11 indicates maximum and minimum hopping frequencies of the subcarrier signals, a frequency interval, a hopping frequency interval and a frequency interval between main carrier signals in accordance with an interleave method without an offset;

FIG. 12 indicates maximum and minimum hopping frequencies of the subcarrier signals, a frequency interval, a hopping frequency interval and a frequency interval between main carrier signals in accordance with the interleave method with the offset;

FIG. 13 indicates maximum and minimum hopping frequencies of the subcarrier signals, a frequency interval, a hopping frequency interval and a frequency interval between main carrier signals in accordance with an interleave method where primary and secondary side bands overlapped:

FIG. 14 indicates maximum and minimum hopping frequencies of the subcarrier signals, a frequency interval, a hopping frequency interval and a frequency interval between main carrier signals in accordance with an overlap method;

FIG. 15 schematically shows a relationship between the outputs of the Tags and channels according to a second embodiment;

FIG. 16 shows a modification of the relationship between the outputs of the Tags and channels and reconfiguration thereof;

FIG. 17 shows another modification of the relationship between the outputs of the Tags and channels;

FIG. 18 shows an illustrative configuration of a communication system according to a third embodiment;

FIG. 19 shows a relationship between the main carrier signals and subcarrier signals used in the communication system shown in FIG. 1;

FIGS. 20A–20K show a timing chart and frequency allocation illustrating signals at the Tags:

FIG. 21 shows outputs for channels;

FIGS. 22A–22C show frequency spectrums indicating intervals between the subcarrier signals; and FIG. 23 is a block diagram showing a modification of the Tag.

DETAILED DESCRIPTION OF THE EMBODIMENTS

Hereinafter, communication system according to embodiments of the invention will be described with reference to the accompanying drawings.

First Embodiment

FIG. 1 shows an illustrative configuration of a communication system 1 according to a first embodiment. As shown in FIG. 1, the communication system 1 includes, but not limited to, two Interrogators 10 and 11 and four Tags 20, 21, 22 and 23. The Interrogator 10 transmits a main carrier signal FC1, which is irradiated to the Tags 20, 21 and 22, and the Interrogator 11 transmits a main carrier signal FC2, which is irradiated to the Tags 22 and 23. From the Tags 20–23, reflected signals Fs1, Fs2, Fs3 and Fs4 are returned to the Interrogators.

Each of the Tags 20–23 applies a primary modulation to a subcarrier signal with an information signal, and then applies a secondary modulation to the main carrier received from the Interrogator with the primarily modulated subcarrier signal. The secondary modulated signals are emitted as the reflected signals Fs1–Fs4 by the Tags 20–23, respectively.

Figure 2:
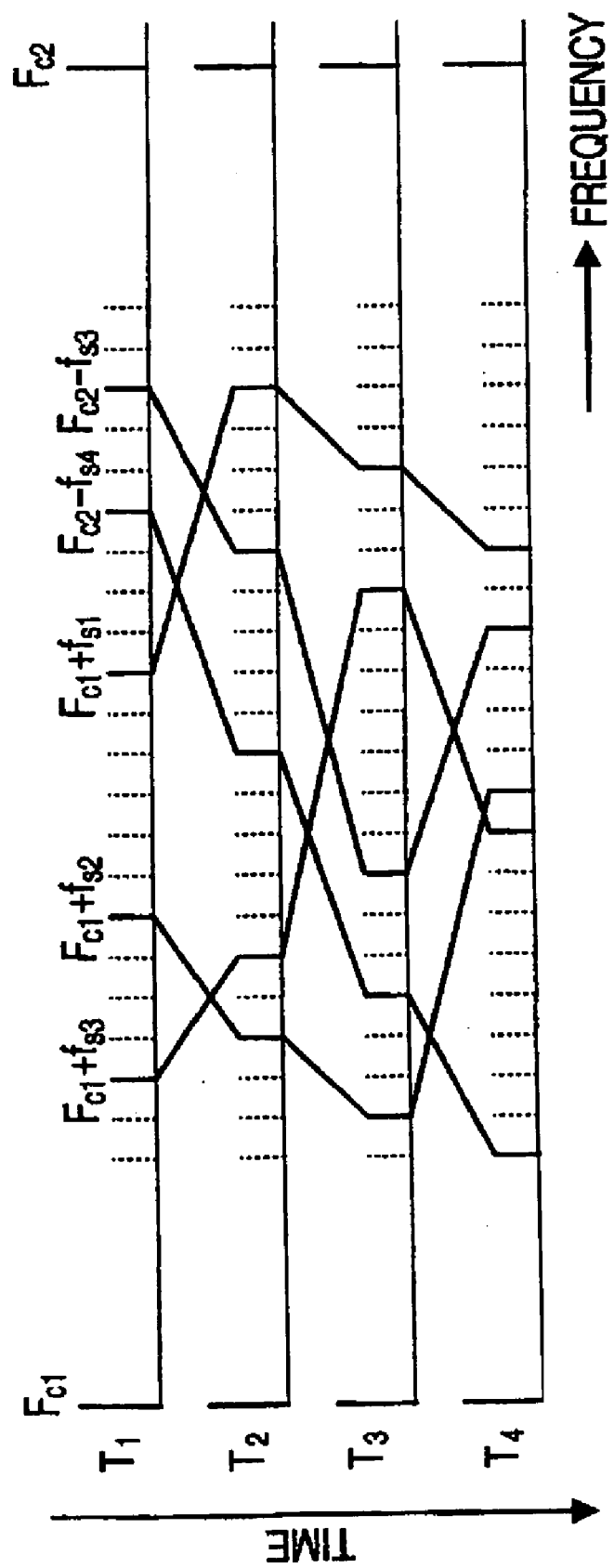
FIG. 2 shows a relationship between the main carrier signals and subcarrier signals used in the communication system shown in FIG. 1.

As shown in FIG. 2, if the frequency of the main carrier signal FC2 is higher than the frequency of the main carrier signal FC1, side band signals Fs3=FC2−fs3 and Fs4=FC2−fs4 exist as well as side band signals FS1=FC1+fs1, Fs2=FC1+fs2 and Fs3=FC1+fs3 within a reception band of the Interrogator 10, where fs1, fs2, fs3 and fs4 are subcarrier frequencies. It should be noted that, by modulation, side band signals in upper and lower side bands are generated. However, in FIG. 2, only the side band signals in one side band are shown for the sake of simplicity of the drawing. In FIG. 2, the four charts (columns) correspond to time steps T1–T4 at which the reflected signals Fs1–Fs4 of the Tags 20–23 are generated. The four Tags 20–23 vary the subcarrier frequencies at random at each time slot (i.e., the subcarrier hopping is performed). In FIG. 2, lines connecting the charts Indicate the change of the subcarrier frequencies.

Since the subcarrier frequencies are hopped with the time steps T1, T2, T3, T4, . . . , as shown in FIG. 2, the possibility that the side band signals collide with each other is very small. Accordingly, the Interrogator 10 is capable of extracting information signals from the reflected signals transmitted from the Tags 20, 21 and 22.

Figure 3:
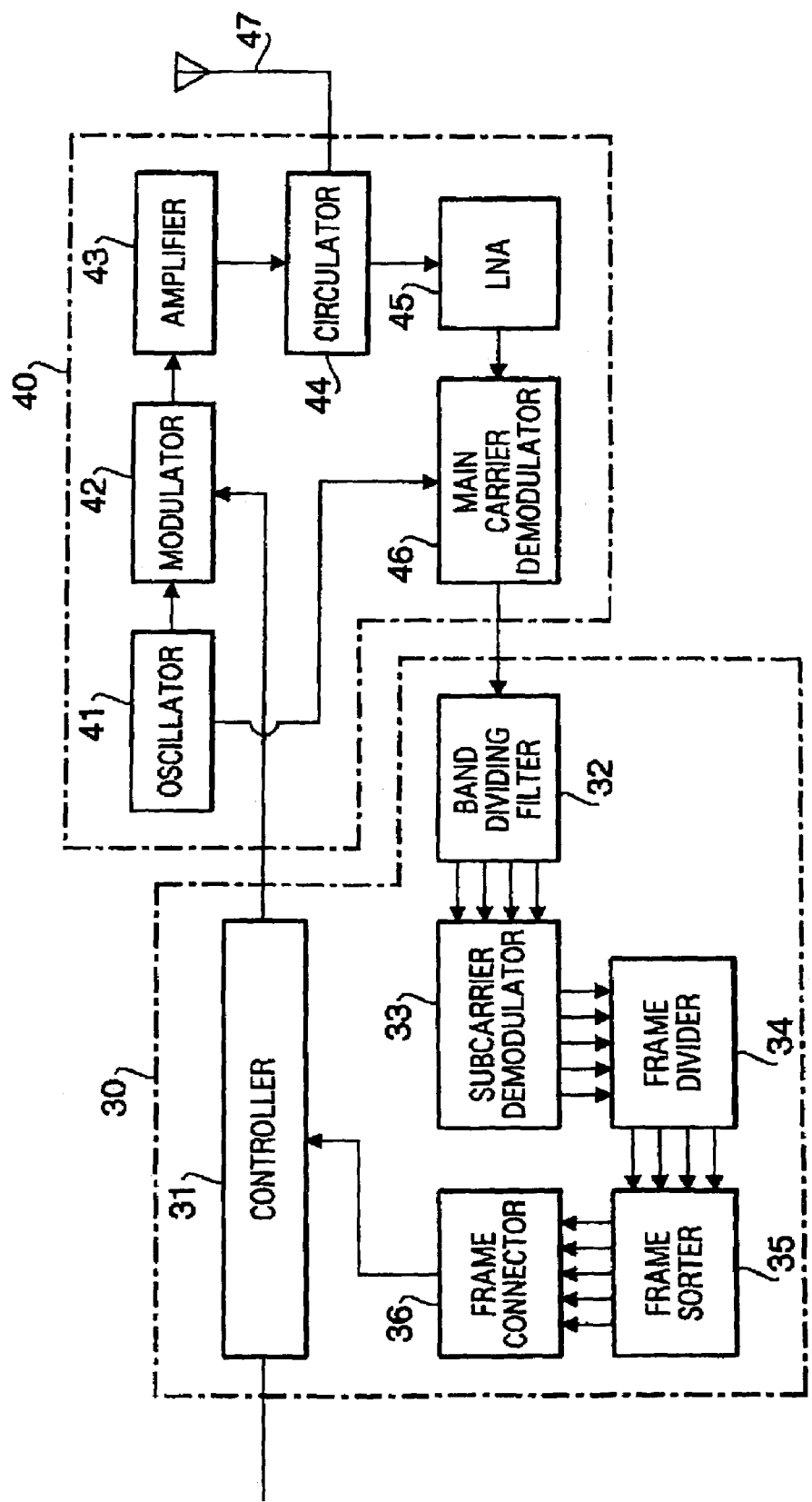
FIG. 3 is a block diagram showing a configuration of an Interrogator of the communication system.

FIG. 3 is a block diagram showing an electrical configuration of the Interrogator 10. As shown in FIG. 3, the Interrogator 10 includes a digital circuit unit 30 and an analog circuit unit 40.

The analog circuit unit 40 includes an oscillator 41 outputting the main carrier signal whose frequency is for example, 900 MHz, 2.4 GHz or 5 GHz. The analog circuit unit 40 further includes a modulator 42 which modulates the main carrier signal output by the oscillator 41 based on the ID of the Interrogator, hopping timing and/or hopping pattern in accordance with the ASK (Amplitude Shift Keying), a power amplifier 43 which amplifies the main carrier signal modulated by the modulator 42, a circulator 44 which transmits the output of the power amplifier 43 to an antenna 47, and transmits the radio wave received by the antenna 47 to a low noise amplifier (LNA) 45, which amplifies the radio signal received through the antenna 47 and a main carrier signal demodulator 46 which performs homodyne detection by mixing the received signal amplified by the LNA 45 with the signal output by the oscillator 41.

The digital circuit unit 30 includes a band dividing filter 32 which applies an A/D conversion to the received signal that is homodyne-detected by the main carrier demodulator 46, and divides the converged signal into channels corresponding to the hopping frequencies by its filtering function, a subcarrier signal demodulator 33 which demodulates the subcarrier signals divided by the band dividing filter 32 to reproduce original information signals, a frame divider 34 which separates appropriate frames from the outputs of the channels generated by the subcarrier signal demodulator 33, a frame sorter 35 which sorts the frames output by the frame divider 34, a frame connector 36 which connects the sorted frames for respective Tags in chronological order, and a controller 31 which controls the entire operation of the Interrogator 10. It should be noted that the connected information signal for each Tag is input to the controller 31. Although not described, the Interrogator 11 has the similar configuration as the Interrogator 10.

Figure 4:
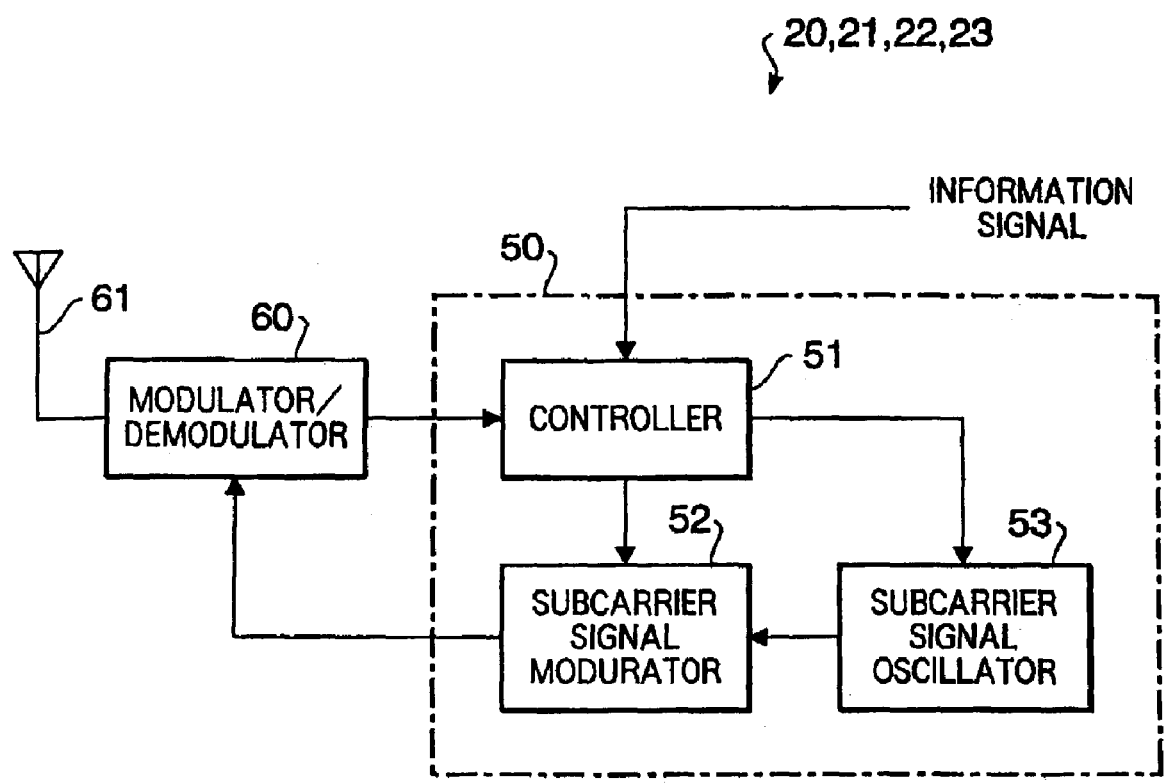
FIG. 4 is a block diagram showing a configuration of each Tag.
Figure 5:
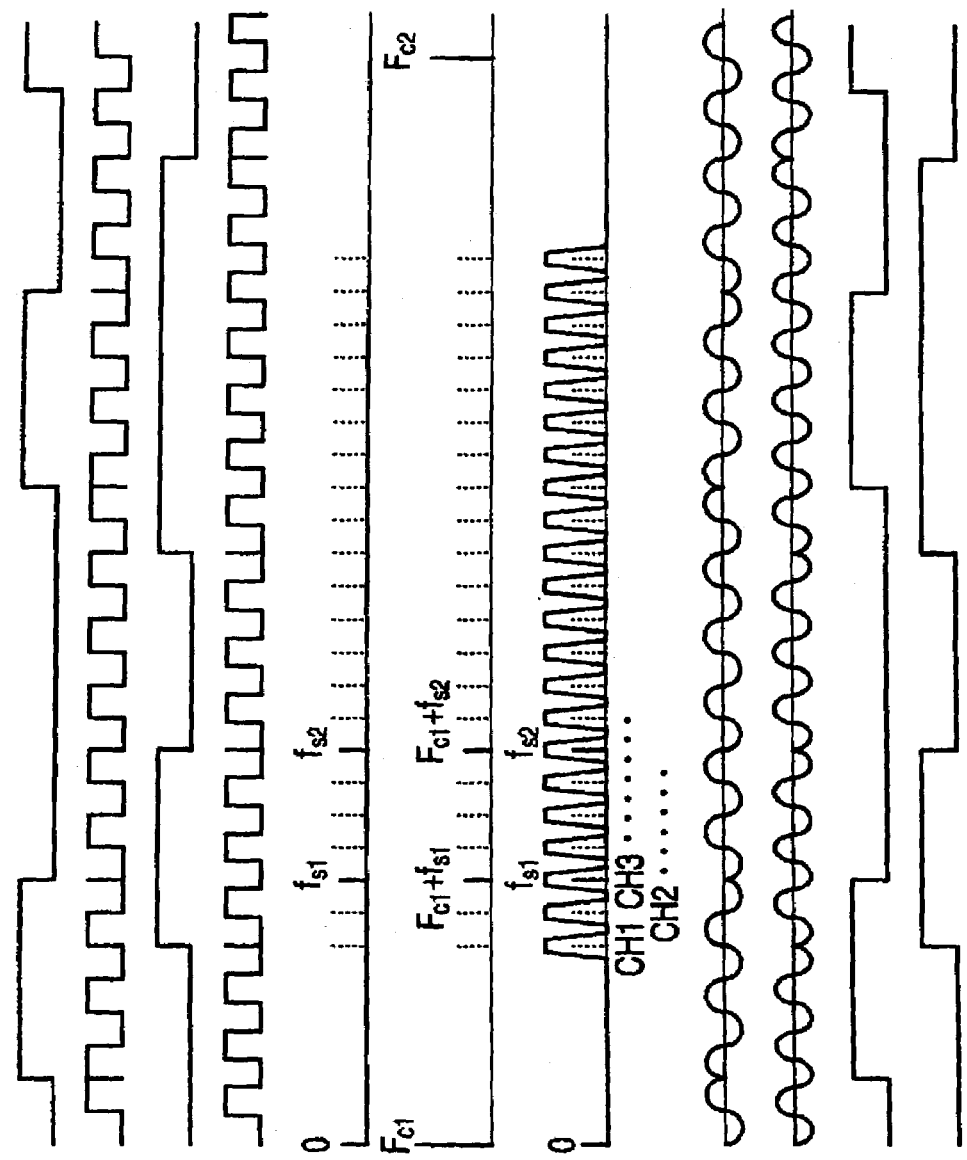
FIGS. 5A–5K show a timing chart and frequency allocation illustrating signals at the Tags.

FIG. 4 is a block diagram of each of the Tags 20–23. It should be noted that the Tags 21–23 have the same configuration of the Tag 20, and therefore only the configuration of Tag 20 is described. As shown in FIG. 4, the Tag 20 includes an antenna 61, a modulator/demodulator 60 connected to the antenna 61 and a digital circuit unit 50. The digital circuit unit 50 includes a controller 51 which controls the entire operation of the Tag 20, a subcarrier signal oscillator 53 which outputs a subcarrier signal, and a subcarrier signal modulator 52 which modulates the subcarrier signal output by the subcarrier signal oscillator 53 with an information signal input through the controller 51 in accordance with the PSK (Phase Shift Keying). The subcarrier signal modulated by the subcarrier signal modulator 52 is input to the modulator/demodulator 60, which modulates the main carrier signal transmitted from the Interrogator 10 with the modulated subcarrier signal, and transmits the resultant signal (i.e., the secondary modulated signal) from the antenna 61 as the reflected signal.

It should be noted that the subcarrier signal may be modulated in accordance with the FSK (frequency shift keying) instead of the PSK. Optionally, the subcarrier signal oscillator 53 and the subcarrier signal modulator 52 may be integrated into a chip and implemented in the controller 51.

Next, the operation of the communication system 1 configured above will be described with reference to FIGS. 1 through 14.

Figure 6:
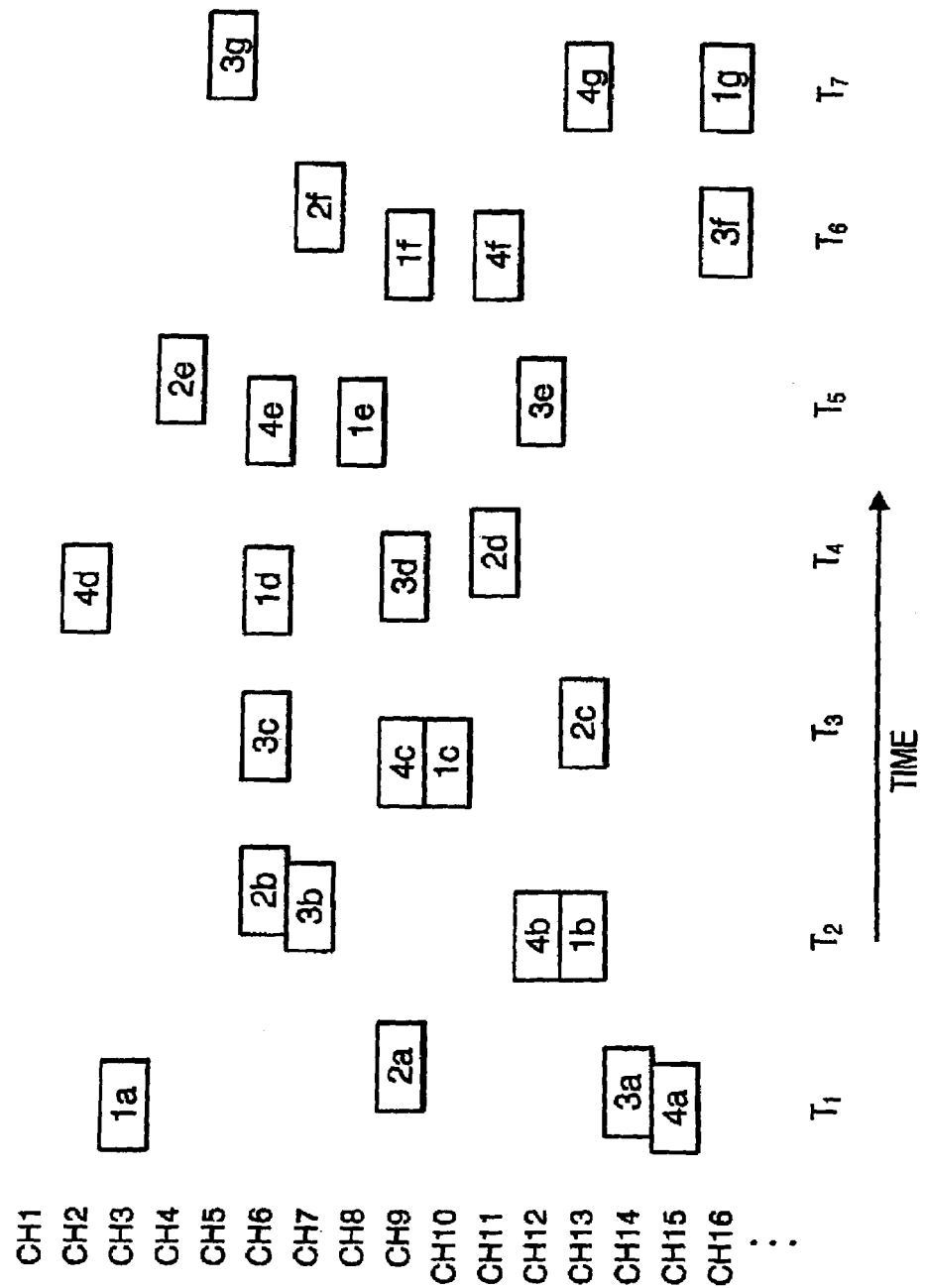
FIG. 6 shows outputs for channels.
Figure 7:
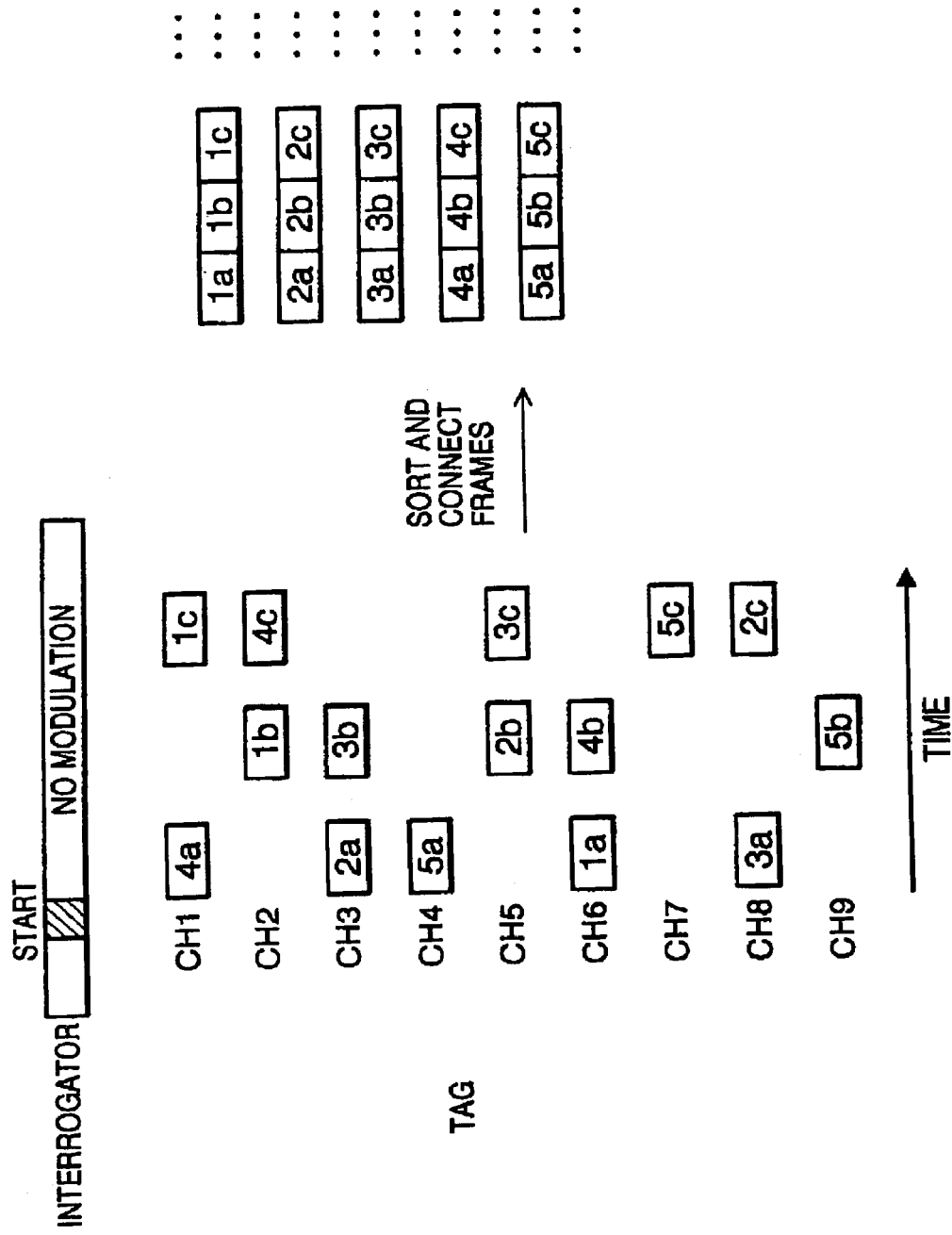
FIG. 7 shows outputs for channels and reconfiguration thereof.

FIGS. 5A–5K show a timing chart and frequency allocation illustrating signals at the Interrogators 10 and 11, and Tags 20 and 21, FIGS. 6 and 7 show outputs of respective channels, and FIGS. 8 through 14 indicate maximum and minimum hopping frequencies of the subcarrier signals, a frequency interval, a hopping frequency interval and a frequency interval between main carrier signals.

In the Interrogator 10, the oscillator 41 outputs the main carrier signal FC1 whose frequency is 900 MHz, 2.4 GHz, 5 GHz or the like. The main carrier signal FC1 output by the oscillator 41 is ASK modulated by the modulator 42, when necessary, in accordance with the information representing the ID number of the Interrogator 10, hopping timing, hopping pattern and the like under control of the controller 31. The ASK modulated signal is transmitted from the antenna 47 via the circulator 44. The Tag 20 receives the main carrier signal FC1 transmitted by the Interrogator 10.

The subcarrier signal modulator 52 performs the PSK with respect to the subcarrier signal output by the subcarrier signal oscillator 53 in accordance with the information signal indicated in FIG. 5A to generates the modulated subcarrier signal Fs1 as shown in FIG. 5B. The modulated subcarrier signal Fs1 is applied to the modulator/demodulator 60.

In the Tag 21, which also receives the main carrier signal FC1 from the Interrogator 10, performs the similar operation. That is, the subcarrier signal modulator 52 performs the PSK with respect to the subcarrier signal output by the subcarrier signal oscillator 53 in accordance with the information signal indicated in FIG. 5C to generates the modulated subcarrier Fs2 as shown in FIG. 5D. The modulated subcarrier signal Fs2 is applied to the modulator/demodulator 60 of the Tag 21.

FIG. 5E shows a frequency spectrum of the subcarrier signals Fs1 and Fs2 (horizontal axis represents the frequency: origin "O" represents zero Hz). In the Tag 20, the modulator/demodulator 60 modulates the main carrier signal FC1 with the subcarrier signal Ps1 in accordance with ASK or PSK, and then, the modulated signal is radiated from the antenna 61 as the reflected signal Ps1. The radio signal radiated from the antenna 61 has a spectrum characteristic as shown in FIG. 5F (it only shows a side band on the upper side with respect to the frequency FC1. Specifically, in FIG. 5F, FC1 represents the main carrier signal output by the Interrogator 10, FC2 represents the main carrier signal output by the Interrogator 11, FC1+fs1 represents the reflected signal from the Tag 20, and FC1+fs2 represents the reflected signal from the Tag 21.

In the Interrogator 10, the signal received from the Tag is transmitted to the LNA 45 via the circulator 44 and amplified by the LNA 45. In the main carrier signal demodulator 46, the signal output by the oscillator 41 is mixed with the signal output by the LNA 45 to perform the homodyne detection. The reception band width is a width which includes the side bands of the maximum hopping frequency and does not include the frequency of adjoining main carrier. Since the main carrier signal has larger intensity than the intensity of the reflected signal, if the adjoining frequency of the main carrier is included, the intensity of the reflected signal is relatively low, and the S/N ratio is decreased.

When the homodyne detection is performed, as shown in FIG. 5G, a signal which is a mixture of the subcarrier signal of the reflected signal Fs1 from the Tag 20 and the subcarrier signal of the reflected signal Fs2 from the Tag 21 is demodulated. This signal is converted into digital values by an A/D converter (not shown) built-in the band dividing filter 32. The band dividing filter 32 further processes the subcarrier signal of the reflected signal Fs1 from the Tag 20 and the subcarrier signal of the reflected signal Fs2 from the Tag 21 by applying filtering in accordance with Fourier transformation to separate the signals into channels (CH1, CH2, CH3, . . . ) corresponding to the hopping frequency bands. Then, inverse Fourier transformation is applied to convert the signal at each channel into each time-series signal, the subcarrier signal of the reflected signal Fs1 from the Tag 20 is extracted as the modulated subcarrier signal, which is shown In FIG. 5H. Similarly, the subcarrier signal of the reflected signal Ps2 from the Tag 21 is extracted as the modulated subcarrier signal, which is shown in FIG. 5I. It should be noted that, in actual performance, sequences of numbers representing the waveforms shown in FIGS. 5H and 5I are obtained.

It should be noted that a timing signal for the frequency hopping may be transmitted to the Tags 20, 21 and 22 by the ASK modulation of the modulator 42 of the Interrogator 10. In such a configuration, the Tags 20, 21 and 22 perform the frequency hopping at every receipt of such a timing signal. The Interrogator 10 receives the reflected signals from the Tags 20, 21 and 22. The reflected signals are homodyne-detected by the main carrier signal demodulator 46, and are A/D converted into digital data. The converted digital data is divided into data blocks synchronously with the timing of the frequency hopping. To the data blocks, Fourier transformation and inverse Fourier transformation are applied, thereby a frame dividing procedure, which will be described later, can be performed easily.

When a hopping of the subcarrier signal frequency is carried out, a subcarrier signal is output from a different channel at every hopping. The output subcarrier signal is demodulated using the subcarrier demodulator 33, thereby the original information signal is extracted. Specifically, as to the reflected signal Fs1 from the Tag 20, an information signal shown in FIG. 5J is obtained by demodulating the signal shown in FIG. 5H. Regarding the reflected signal Fs2, the information signal shown in FIG. 5K is obtained by demodulating the signal shown in FIG. 5I From the channels, the information signals carried by the subcarrier signals which are switched at each frequency hopping are subsequently output. The output signals from the channels are divided into appropriate frames using the frame divider 34, and the frame sorter 35 sorts the frames into respective Tags. The thus separated frames are reconfigured as they are connected by the frame connector 36 in the order of the time-series and are input to the controller 31.

Next, the output from each channel is described with reference to FIG. 6. FIG. 6 schematically shows outputs frames from each channel. The number in each box represents a Tag number and the letter following the number indicates a chronological order. For example, the information of the Tag 20 starts from "1a", followed by "1b", "1c", "1d", "1e", . . . Similarly, the outputs from the Tag 21 are indicated as "2a", "2b", "2c", . . . , the outputs from the Tag 22 are indicated as "3a", "3b", "3c", . . . , and the outputs from the Tag 23 are indicated as "4a", "4b", "4c", . . .

In the example shown in FIG. 6, the output frames of each channel are configured such that, channel 2 outputs the signal from the Tag 23, channel 3 outputs the signal from the Tag 20, channel 4 outputs the signal from the Tag 21, channel 5 outputs the signal from the Tag 22, channel 6 outputs the signals from Tags 21, 22, 20 and 23, channel 7 outputs the signals from Tags 22 and 21, channel 8 outputs the signal from the Tag 20, channel 9 outputs the signals from the Tags 21, 23 22 and 20, channel 10 outputs the signal from the Tag 20, channel 11 outputs the signals from the Tags 21 and 23, channel 12 outputs the signals from the Tags 23 and 22, channel 13 outputs the signals from the Tags 20, 21 and 23, channel 14 outputs the signal from the Tag 22, channel 15 outputs the signal from the Tag 23, and channel 16 outputs the signals from the Tags 22 and 20.

The above output frames are divided with the frame divider 34 and are selected and sorted for each Tag using the frame sorter 35, and re-configured by connecting the output frames in the order of time-series using the frame connector 36. For example, when information of the output from the channel 3 is "1a" at time step T1, information of the output from the channel 13 is "1b" at time step T2, information of the output from the channel 10 is "1c" at time step T3, information of the output from the channel 6 is "1d" at time step T4, information of the output from the channel 8 is "1e" at time step T5, information of the output from the channel 9 is "1f" at time step T6, the output from the Tag 20 is reconfigured such that the frames are ordered in accordance with the information, i.e., arranged in the order of "1a", "1b", "1c", "1d", "1e", "1f" and "1g".

The frame separation and re-configuration will be described in detail with reference to FIG. 7. FIG. 7 shows the outputs from each channel. In the example shown in FIG. 7, if the information included in a frame is "4a", the number "4" represents the Tag 23, and "a" represents the chronological order such that the frame is the first frame. It should be noted the frame includes other information which is also transmitted from the Tag.

AS shown in FIG. 7, when the Interrogator starts transmitting the main carrier signal with no modulation, the reflected signals from respective Tags are received simultaneously. Specifically, hopping subcarrier signals are received in channels CH1 through CH9, respectively.

At a first simultaneous reception, the subcarrier signal fsc4 is received in CH1 and a frame including information "4a" is obtained. At this stage, the subcarrier signal fsc2 is received in CH3 and a frame including information "2a" is obtained, the subcarrier signal fsc5 is received in CH4 and a frame including information "5a" is obtained, the subcarrier signal fsc1 is received in CH6 and a frame including information "1a" is obtained, and the subcarrier signal fsc3 is received in CH8 and a frame including information "3a" is obtained.

In the next simultaneous reception, the subcarrier signal fsc1 is received in CH2 and a frame including information "1b" is obtained, the subcarrier signal fsc3 is received in CH3 and a frame including information "3b" is obtained, the subcarrier signal fsc2 is received in CH5 and a frame including information "2b" is obtained, the subcarrier signal fsc4 is received in CH6 and a frame including information "4b" is obtained, and the subcarrier signal fsc5 is received in CH9 and a frame including information "5b" is obtained.

In the next simultaneous reception, the subcarrier signal fsc1 is received in CH1 and a frame including information "1c" is obtained, the subcarrier signal fsc4 is received in CH2 and a frame including information "4c" is obtained, the subcarrier signal fsc3 is received in CH5 and a frame including information "3c" is obtained, the subcarrier signal fsc5 is received in CH7 and a frame including information "5c" is obtained, and the subcarrier signal fsc2 is received in CH8 and a frame including information "2c" is obtained.

Then, by separating and chronologically connecting the frames in accordance with the information, as show in FIG. 7, information signals "1a, 1b, 1c", "2a, 2b, 2c", "3a, 3b, 3c", "4a, 4b, 4c" and "5a, 5b, 5c" for respective Tags are demodulated.

Since the hopping subcarrier signals of the reflected signals transmitted from the Tags are received as described above, the controller 51 detects the channels in which collision of the frequencies of the subcarrier signals has occurred as the channels in which the demodulation has not been performed correctly, the channels in which correct information signals have not been obtained, or the channels in which an error has occurred. Therefore, a modification can be made in which all the channels in which the collision of the subcarrier frequencies have occurred may be notified to all the Tags. With such a modification, a complicated procedure for detecting Tags in which the collision has occurred and notifying the occurrence of the error to the detected Tags becomes unnecessary. Only by notifying the channel numbers of the channels where the collision have occurred, all the Tags which used the notified channels recognize the occurrence of the collision and/or error conditions.

In the conventional frequency hopping, the frequency hopping is carried out with the two transceivers being synchronized. Therefore, one transceiver demodulates only the signal transmitted from another transceiver in the order of time-series, and the signals transmitted from other transceivers are regarded as unnecessary signals and eliminated. On the contrary, according to the embodiment, the Interrogator does not perform the frequency hopping, and receives the signals in all the frequency band at a time. Therefore, each the signals transmitted from all the Tags are output from any one of the channels. Accordingly, by reconfiguring the output signals chronologically for respective Tags' information signals, the signals from a plurality of Tags can be detected simultaneously. Because of this configuration, each tag transmits information of the Tag at every frequency hopping and/or a frame end marker before the hopping is performed. It should be noted that, if the hopping pattern is known, the frame can be reconfigured in accordance with the hopping pattern.

Next, with reference to FIGS. 8 through 14, the minimum and maximum hopping frequencies of the subcarrier signal, and a relationship between an interval of the hopping frequencies and an interval between the frequencies of the main carrier signals of the Interrogators according to the present embodiment will be described.

FIG. 8 shows a frequency spectrum when the minimum and maximum hopping frequencies of the subcarrier signal are defined. FIG. 9 shows a frequency spectrum when the guard band method is employed. FIGS. 10 through 13 show frequency spectrums when an interleave method is employed, and FIG. 14 is a frequency spectrum when an overlapping method is employed.

Firstly, with reference to FIG. 8, a case where the minimum and maximum hopping frequencies of the subcarrier signal are defined is explained. In the example shown in FIG. 8, Fc denotes the main carrier signal frequency, fsc denotes the subcarrier signal band, fL denotes the minimum frequency of the subcarrier signal and fH denotes the maximum frequency of the subcarrier signal. In this example, the minimum frequency fL of the subcarrier signal is greater than the subcarrier signal hopping frequency interval $\Delta f$. Therefore, it is possible to avoid a noise including low-frequency components close to, DC which is an unnecessary reflection and the like, coming from reflecting objects in the vicinity of the Tags without being modulated.

The guard band method will be described. In the example shown in FIG. 9, Fc1 and Fc2 denote the main carrier signals, fsc denotes the subcarrier signal band, fH denotes the maximum subcarrier signal frequency. An interval of the adjoining main carrier signals Fc1 and Fc2 is greater than twice the maximum subcarrier signal frequency fH. Thus, between maximum subcarrier signal frequency fH of the main carrier signal Fc1 and the maximum subcarrier signal frequency fH of the main carrier signal Fc2, a guard band which is an unused band is defined. Therefore, the collision between maximum subcarrier signal frequency fH of the main carrier signal Fc1 and the maximum subcarrier signal frequency fH of the main carrier signal Fc2 can be avoided.

With reference to FIG. 10, a case where the interleave method is employed will be described. In the example shown in FIG. 10, Fc1 and Fc2 denote the main carrier signals, fL denotes the minimum subcarrier signal frequency, fH denotes the maximum subcarrier signal frequency, $\Delta f$ denotes the subcarrier signal hopping frequency interval, $\Delta f/2$ denotes a half of the subcarrier signal hopping frequency interval. According to the interleave method, an interval between the adjoining main carrier signals Fc1 and Fc2 is the sum of the maximum subcarrier signal frequency fH, the minimum subcarrier signal frequency fL and a half of the subcarrier signal hopping frequency interval $\Delta f$. Therefore, in the midst of the subcarrier signal hopping frequency interval of the main carrier Fc1, the hopping frequency of the subcarrier signal of the main carrier signal Fc2 is arranged. With this configuration, a collision between a primary side band signal which is generated when the main carrier Fc1 is modulated with the subcarrier and the primary side band signal which is generated by the main carrier signal Fc2 next to the main carrier signal Fc1 does not occur. Therefore, the frequency usage efficiency can be improved.

Further, as shown in FIG. 11, by satisfying $$fL=(2M+1)\Delta f/2$$

$$fH=(4M-1)\Delta f/2$$

$$Fc2-Fc1=4M\Delta f$$

where M is an integer, the collision between the primary side band FS which is generated when the main carrier signal Fc1 is modulated with the subcarrier signal, and the secondary side band F2I which is generated when the adjoining main carrier signal Fc2 is modulated with the subcarrier signal will not occur. Further, the primary side band FI which is generated when the main carrier signal Fc2 is modulated with the subcarrier signal and the secondary side band F2S which is generated when the adjoining main carrier Fc1 is modulated with the subcarrier signal will not collide with each other. Therefore, with this configuration, the frequency usage efficiency can be improved.

Alternatively, as shown in FIG. 12, by satisfying a condition:

$$Fc2-Fc1=4M\Delta f+L\Delta f/2,$$

where L is an integer.

the frequency usage efficiency can be improved.

As shown in FIG. 13, the following conditions may be satisfied.

$$fL=(L+1)\Delta f/2$$

$$fH=(L+2M-1)\Delta f/2$$

$$Fc2-Fc1=(4M+3L)\Delta f/2$$

where, M and L are integers, respectively.

In this case, the primary side band FS which is generated by modulating the main carrier signal Fc1 with the subcarrier signal will not collide with the secondary side band F2S which is generated by modulating the main carrier signal Fc1 with the subcarrier signal and with the secondary side band F2I which is generated by modulating the main carrier signal Fc2 with the subcarrier signal. Further, the primary side band FI which is generated by modulating the main carrier signal Fc2 with the subcarrier signal will not collide with the secondary side band F2I which is generated by modulating the main carrier signal Fc1 with the subcarrier signal and with the secondary side band F2S which is generated by modulating the main carrier signal Fc1 with the subcarrier signal. Therefore, also in this case, the frequency usage efficiency can be improved.

Next, with reference to FIG. 14, a case where the overlapping method is employed will be described. In the example shown in FIG. 14, Fc1 and Fc2 denote the main carrier signals. An interval between the main carrier signals Fc1 and Fc2 is equal to the maximum subcarrier signal frequency and the minimum subcarrier signal frequency. Further, when the two hopping patterns thereof are chronologically symmetrical with respect to each other, only one of these two hopping patterns is used. In the example shown in FIG. 14, for the responses to the main carrier signal Fc1, channel 1, channel 2, channel 3, channel 4, channel 5 and channel 6 are assigned in this order from the main carrier signal Fc1 side as the channels to be used for the subcarrier signals. For the responses to the main carrier signal Fc2, channel 1, channel 2, channel 3, channel 4, channel 5 and channel 6 are assigned in this order from the main carrier signal Fc2 side as the channels to be used for the subcarrier signals. Therefore, the Tag 20, which modulates the main carrier signal Fc1 executes the frequency hopping in the order of channel 1, channel 3 and channel 6, while the Tag 21, which modulates the main carrier signal Fc2, executes the frequency hopping in the order of channel 6, channel 4 and channel 1. In this case, at positions a, b and c, the collision occurs. Therefore, one of these two hopping patterns which are chronologically symmetrical should be used. It should be noted that if the number of channels is odd, there is a possibility that the collision occurs in the central channel, and therefore the channel of the central frequency is not used.

In particular, when only one hopping pattern is used for a specific Interrogator and the collision is to be avoided by shifting the phase of the hopping, if the hopping pattern for another Interrogator is symmetrical with respect to one for the specific Interrogator, the possibility of the occurrence of the collision increases. When such chronological hopping patterns exist, by using only one of the hopping patterns, the collision can be avoided. For example, a hopping pattern is determined by the Interrogator ID, and by determining the starting phase of the hopping with the Tag ID, the possibility the ID code of "5-6" in channel 8, which indicates that the previous channel is channel 5. Thus, the frames are connected such that the frames "9-5", "not received due to error" and "5-6" are connected.

The frame whose ID code is "7-6" in channel 1 is not received due to the frequency collision in the first simultaneous reception. However, in the next simultaneous reception, the frame in the channel 6 has the ID code "1-2" which indicates that the previous channel is channel 1. Further, from this ID code, it is known that the next channel at the next simultaneous reception is channel 2. Therefore, the frame whose ID codes are "not received due to error", "1-2" and "6-9" are connected.

As described above, in the second embodiment, even though the hopping pattern is unknown, the previous and the following channels can be recognized, and accordingly, the frames can be connected and an error can be detected relatively easily.

In the above-described second embodiment, as the ID code of the frame, the previous and following channels are added. It can be modified such that the two previous channels and one following channel may be indicated in each ID code as shown in FIG. 16. Alternatively, as shown in FIG. 17, one previous channel and two following channels may be indicated in the ID code. According to such configurations, even if the frequency collision occur, the channel before the collision or after the collision can be identified, and therefore the frames can be connected. For example, even when the collision occurs in channel 9, it is known that one frame is in channel 5 and the other is in channel 2.

Optionally, in the communication system, a collision detection system may be provided to detect the collision of the subcarrier frequencies, and the communication system may be modified to notify the information of the collision of the subcarrier frequencies to each Tag. With such configuration, each Tag can check whether the notified frequency is used before receiving the notification, and re-transmits the information which was transmitted before the notification. In such a case, it is unnecessary for the Interrogator to identify the Tags in which the collision occurred. That is, only by notifying the collision frequency information to the Tags, the error can be compensated, which facilitates the error control procedure.

Further, the system configuration may be modified such that the Tags transmit only the ID Information as data, and information is transmitted by varying the hopping patterns. It should be noted that the subcarrier hopping is the technique which is not limited to the Tags using microwave band. Thus, such a modification can be employed in the wireless Tags using the 13.56 MHz or 125 kHz waves as the main carrier waves, whose antenna has a coil shape and exchange data in accordance with electromagnetic induction.

As described above, the Tag includes a receiving/reflecting system that receives the main carrier transmitted by the Interrogator and transmits the reflected signal to the Interrogator and a modulated subcarrier signal hopping system. The modulated subcarrier signal hopping system is provided with a frequency hopping system that applies frequency hopping to a subcarrier, and a subcarrier modulating system that modulates the subcarrier signal with a predetermined information signal.

The Tag further includes a main carrier modulating system that modulates the main carrier received through the receiving/reflecting system with the modulated subcarrier modulated by the subcarrier modulating system, the modulated main carrier being transmitted to the Interrogator through the receiving/reflecting system as the reflected signal.

Since the different frequencies of the subcarriers are assigned for different Tags, and the frequency hopping is applied to the subcarrier signals, even if the reflected signals are received simultaneously by the Interrogator(s), there is little possibility that the collision of the reflected signals occurs. Therefore, the information signals corresponding to a plurality of Tags can be obtained, respectively. Further, it is unnecessary to control the transmission timing of the main carrier signal and all the frequency band of frequency-hopped subcarrier signals used for modulating a second main carrier are at least partially overlapped, and each of the frequency-hopped subcarrier signals used for modulating the first main carrier signal and each of the frequency-hopped subcarrier signals used for modulating the second main carrier are frequency-arranged in accordance with an interleaving relationship.

According to the embodiments described above, an interval of a plurality of main carrier signals transmitted by the at least one Interrogator is a sum of a maximum hopping frequency of frequency-hopped subcarrier signals and a minimum hopping frequency of the frequency-hopped subcarrier signals and a half of an interval of hopping frequencies of the subcarrier signals hopped by the frequency hopping system. Thus, the frequency usage efficiency can be improved by employing a frequency interleave.

Further, a primary side band generated by modulating a first main carrier signal with the subcarrier signal and a secondary side band generated by modulating a second main carrier signal with the subcarrier signal do not collide with each other, and a minimum hopping frequency, a maximum hopping frequency and a hopping frequency interval of the subcarriers which is frequency-hopped by the frequency hopping system, and a frequency Interval of first and second main carriers of the at least one Interrogator are determined such that the primary side band, the secondary side band and a side band generated by the first and second main carrier signals do not collide with each other. Accordingly, it is also possible to improve the frequency usage efficiency by interleaving the frequencies.

Optionally, an interval between a plurality of main carrier signals transmitted by the at least one Interrogator is equal to the sum of maximum hopping frequency and minimum hopping frequency of the frequency-hopped subcarrier signals frequency-hopped by the frequency hopping system, one of hopping patterns which are chronologically symmetric being used for frequency hopping. In this case, by overlaying the frequencies, the frequency usage efficiency can be improved.

Optionally, the Tag is further provided with a hopping pattern determining system that determines a hopping pattern for the subcarrier signal in accordance with identification information of the Interrogator, and a starting phase determining system that determines a starting phase of the hopping to be used for frequency hopping the subcarrier signal in accordance with the identification information of the Interrogator. This configuration reduces the possibility that the hopping patterns coincide with each other, thereby the collision being avoidable.

The Tag according to the above-described embodiments further includes an oscillator used to apply the frequency hopping to the subcarrier signal, and a subcarrier modulator that varies one of phase, frequency and amplitude of a signal generated by the oscillator in accordance with a predetermined information signal. The oscillator may be a numerical control oscillator. With this configuration, there is not necessary to provide an external oscillator and modulator, and the subcarrier signal can be modulated with the information signal by a CPU or the like making use of a software function. The frequency hopping is also performed making use of the software functions.

According to the above-described embodiments, the Interrogator includes a transmitting system that transmits the main carrier signal, a reflected signal receiving system that receives a reflected signal, each of the Tags generating the reflected signal by modulating the main carrier transmitted from the Interrogator and received by the Tags, a demodulating system that demodulates the reflected signal received by the reflected signal receiving system to output a demodulated signal, and a data detection system that detects data from the demodulating signal. With this configuration, the demodulating system simultaneously receives signals within a predetermined band including all the hopping frequency ranges defined by minimum hopping frequency and maximum hopping frequency of a subcarrier and applies demodulation to the received signals. embodiment, only one Interrogator is employed. The structure of each of the Interrogator 10, the Tags 20, 21, 22 and 23 is similar to that in the first embodiment, and the description thereof will not be repeated for the sake of brevity. From the Interrogator 10, the main carrier signal FC1 is transmitted, which is irradiated to the Tags 20–23. The Tags 20–23 returns reflected signals Fs1–Fs4, respectively.

Each of the Tags 20–23 applies a primary modulation by modulating a subcarrier signal with an information signal, and then applies a secondary modulation by modulating the received main carrier with the modulated subcarrier to generate the reflected signal (Fs1, Fs2, Fs3 or Fs4), which is transmitted to the Interrogator 10.

Specifically, as shown in FIG. 19, the frequencies of the subcarrier signals of the Tags are different from each other, and are applied with the frequency hopping. AB shown in FIG. 19, the side band signals Fs1=FC1±fs1, Fs2=FC1±fs2, F3=FC1±fs3 and Fs4=FC1±fs4 are generated (only the side band signals on one side are shown). The reflected signals are applied with the frequency hopping in accordance with pseudo-random coding, and have less possibility of colliding with each other. Therefore, the information signals from the Tags 20, 21, 22 and 23 can be extracted independently from each other. In the example shown in FIG. 19, in an area L, the subcarrier frequency is low (close to FC1) and the hopping frequency interval is relatively narrow, while in area H, the subcarrier frequency is relatively high (far from FC1) and the hopping frequency interval is relatively wide.

A power consumption of the Tags greatly depends on the subcarrier frequency. Since the subcarrier frequency is low in the area L, the power consumption of the Tags generating the subcarrier signals is small. Further, since the hopping frequency interval is narrow, even if the subcarrier signal hopping is performed, the hopping can be done within a lower subcarrier frequency. Therefore, the power consumption can be made small. If the amount of data transmitted from the Tags is small, a data rate can be made lower and the width of the side bands around the subcarrier frequency, which is determined in accordance with the data rate, can be made narrow. Thus, even if the hopping frequency interval is made narrow, it will not affect the communication performance. With respect to the area H, since the hopping frequency interval of the subcarrier signal is wide, the width of the side bands around the subcarrier signal can be made wide, and therefore, the communication can be performed with a high data rate.

Next, operation of the communication system configured as above will be described with reference to FIGS. 18, 19 and 20A–20K. FIGS. 20A–20K show states of signals at various stages of the Interrogator 10, and Tags 21 and 22.

FIG. 21 schematically shows the output of each channel. FIG. 22 shows

It should be noted that the Tag 22, which receives the main carrier signal FC1 from the Interrogator 10, executes the similar procedure as the Tag 21 performs. For example, the subcarrier signal generated by the subcarrier signal oscillator 53 is modulated (phase modulation) by the subcarrier signal modulator 52 in accordance with the information signal shown in FIG. 20C, the subcarrier signal Fs3 as shown in FIG. 20D is generated, which is applied to the modulator/demodulator 60.

Figure 20:
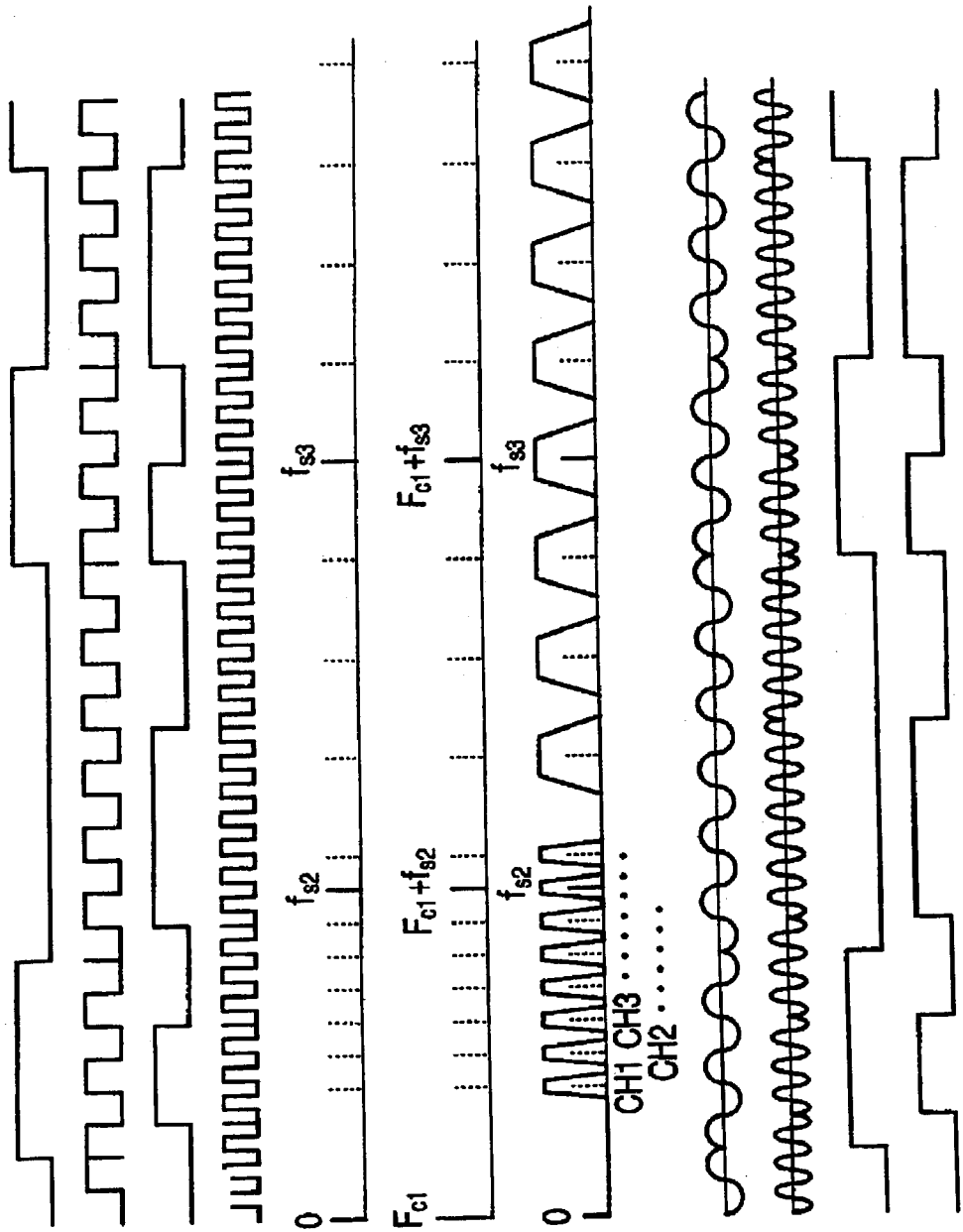

It should be noted that the subcarrier signals Fs2 and Fs3 have a frequency spectrum as shown in FIG. 20E at a certain point of time, where the horizontal axis represents a frequency, origin "O" indicating 0 Hz. In the Tag 21, the modulator/demodulator 60 applies the amplitude modulation or the phase modulation to the main carrier signal FC1 with the subcarrier signal Fs2, which is transmitted through the antenna 61. The radio wave radiated from the antenna 61 shows a frequency spectrum as shown in FIG. 20F. It should be noted that, in FIG. 20F, only the frequency spectrum of an upper sideband is indicated, and the spectrum of the lower sideband is omitted in the sake of brevity. In FIG. 20F, a signal FC1 indicates the main carrier output by the Interrogator 10, a signal FC1+fs2 indicates a reflected signal from the Tag 21, and a signal FC1+fs3 indicates the reflected signal from the Tag 22.

In the Interrogator 10, the signals transmitted from the Tags are input to the LNA 45 via the circulator 44 and amplified by the LNA 45. Then, in the main carrier demodulator 46, a signal output by the oscillator 41 is mixed and the homodyne detection is performed. The receiving band is selected as a band which includes the areas L and H, includes the entire range of the subcarrier hopping, and does not include the adjoining main carrier frequency. The adjoining main carrier band is relatively strong in comparison with the reflected signals which are modulated and reflected by the Tags. Therefore, if the adjoining main carrier frequency is included in the receiving band, the amplitude of the reflected signals are relatively lowered and the S/N ratio is lowered.

When the homodyne detection is executed, as shown in FIG. 20G, a signal including the subcarrier signal of the reflected signal Fs2 from the Tag 21 and the subcarrier of the reflected signal Fs3 of the Tag 22 is demodulated. This signal is converted in to digital values by an A/D converter (not shown) built in the band dividing filter 32. The band dividing filter 32 further applies a filtering process in accordance with the Fourier transformation to the subcarrier signal of the reflected signal Fs2 from the Tag 21 and the subcarrier of the reflected signal Fs3 of the Tag 22 to separate the signal into channels (CH1, CH2, CH3, . . . ) corresponding to the hopping frequencies. The separated signals are converted into chronological signals by applying inverse Fourier transformation. Then, the subcarrier of the reflected signal Fs2 from the Tag 21 is extracted as the modulated subcarrier as shown in FIG. 20H. Similarly, the subcarrier of the reflected signal Fs3 from the Tag 22 is extracted as the modulated subcarrier as shown in FIG. 20I. It should be noted that FIGS. 20H and 20I are graphical representations, and actually, the subcarriers are extracted as series of values corresponding to the waveforms shown in the graphs.

The areas L and H have different filtering bands. However, since the filters are configured as the digital filters, settings of the filtering bands can easily be changed in accordance with the subcarrier frequencies. When the hopping of the subcarrier frequency is effected, at every hopping of the frequency, a subcarrier signal is output from a different channel. By demodulating the thus output subcarrier signals, the original information signals are detected as shown in FIGS. 20J and 20K.

It should be noted that, by the ASK modulation of the modulator 42 of the Interrogator 10, the timing signals of the frequency hopping can be transmitted to the Tags 20, 21, 22 and 23. In this case, the Tags 20–23 execute the frequency hopping at every reception of the timing signals. The reflected signals transmitted by the Tags 20–23 and received by the Interrogator 10 are subject to the homodyne detection in the main carrier demodulator 46, and then A/D converted. By grouping the A/D converted data in accordance with the timing of the frequency hopping, and then applying the Fourier transformation and inversed Fourier transformation to the thus grouped (categorized) data, a frame separation procedure, which will be described later, can be performed easily.

When the hopping of the subcarrier frequency is executed, a subcarrier signal is output from a different channel at every hopping. By demodulating the thus output subcarrier signal using the subcarrier demodulator 33, the original information signal is extracted. Specifically, regarding the reflected signal Fs2 output from the Tag 21, from the waveform shown in FIG. 20H, the information signal having a waveform shown in FIG. 20J is obtained, and from the reflected signal Fs2, which is output from the Tag 22, having a waveform shown in FIG. 20I, the information signal having a waveform shown in FIG. 20K.

From each channel, the Information signal carried by the subcarrier signal which is switched at every frequency hopping is output. The output from each channel is separated into appropriate frames by the frame divider 34, the thus separated frames are sorted by the frame sorter 35 for respective Tags, then the sorted frames are chronologically (i.e., in the order of time-series) connected by the frame connector 36 to reconfigure the information signals, which are input to the controller 31.

Next, the output from each channel will be described with reference to FIG. 21. FIG. 21 schematically shows the output frames of the channels. The number indicated in each rectangle box represents the Tag number, and the alphabet following the Tag number represents the chronological order. For example, the data output from the Tag 20 should be arranged such that "1$a$", "1$b$", "1$c$", "1$d$" . . . in this order. Similarly, the data output from the Tag 21 should be arranged such that "2$a$", "2$b$", "2$c$", "2$d$", . . . . In the example shown in FIG. 21, the channels 1 through 8 use narrow subcarrier frequency, and the channel 9 and later use a wide subcarrier frequency.

In the example shown in FIG. 21, from the channel 1, the signal from the Tag 20 is output, from the channel 2, the signals from the Tag 21 and then from the Tag 20 are output, from the channel 3, the signal from the Tag 20 is output, from the channel 4, the signals output from the Tags 21 and 20 are output in this order, from the channel 5, the signal output from the Tag 21 is output, from the channel 6, the signals output by the Tags 21 and 20 are output in this order, from the channel 7, the signals output by the Tags 20 and 21 are output in this order, from the channel 8, signals from Tags 21 and 20 are output in this order, from the channel 9, the signals from the Tags 22 and 23 are output in this order, from the channel 10, the signals from the Tags 22 and 23 are output in this order, from the channel 11, the signals from the Tags 23 and 22 are output in this order, from the channel 12, the signals from the Tags 22 and 23 are output in this order, from the channel 13, the signal from the Tag 23 is output, from the channel 14, the signals from the Tags 23 and 22 are output in this order, from the channel 15, the signals from the Tags 23 and 22 are output in this order, and from the channel 16, the signal from the Tag 23 is output.

The output frames indicated above are divided to each frame by the frame divide 34 and selected and sorted by the frame sorter 35 for respective Tags, and then the sorted frames are chronologically connected by the frame connector 36.

For example, if the outputs from the Tag 20 include: the output from the channel 3 having the frame ID code of "1a", the output from the channel 7 having the frame ID code of "1b", the output from the channel 1 having the frame ID code of "1c", the output from the channel 6 having the frame ID code of "1d", the output from the channel 4 having the frame ID code of "1e", the output from the channel 8 having the frame ID code of "1f", and the output from the channel 2 having the frame ID code of "1g". These frames are reconfigured in the order of the ID codes and arranged such that "1a", "1b", "1c", "1d", "1e", "1f" and "1g".

Conventionally, two transceivers operate synchronously to perform the frequency hopping. Therefore, one transceiver chronologically demodulates only the signals coming from the other transceiver, and the signals transmitted from the other transceivers are eliminated as unnecessary signals. On the contrary, according to the embodiment, all the band area of the hopping frequency is received simultaneously, and the signal from each of the Tags is output from any one of the channels without fail. Therefore, by reconfiguring the thus output signals chronologically for respective Tag IDs, the signals from a plurality of the Tags can be detected simultaneously. For this purpose, each Tag outputs the ID at every hopping, and a frame end marker before every hopping. Further, the filtering operation as indicated by a trapezoid in FIG. 20G is executed by the function of software making use of the Fourier transformation or the like. With this configuration, the Interrogator need not change or hop the receiving frequency in accordance with the subcarrier, and the filtering and/or demodulating procedures for respective channels can be executed simultaneously. Therefore, the signals from a plurality of Tags can be processed simultaneously.

It should be noted that, if the hopping pattern is known, the frame reconfiguration can be performed in accordance with the known pattern.

Next, with reference to FIGS. 22A–22C, the frequency of the subcarrier signal and hopping frequency interval will be described. In an example shown in FIG. 22A, the hopping frequency interval is narrow in the low frequency area L, while the hopping frequency interval is wide in the high frequency area H. Thus, in the area L, power consumption is suppressed, while, in the area H, high-speed transmission is enabled. For example, by transmitting small-sized data such as the ID of the Tag, status codes (ON/OFF, condition 1, condition 2, . . . ) and the information which can be transmitted at a low data rate (e.g., static data or periodical data which can be received again even if part of the data is not received immediately), the power consumption of the Tags can be reduced. Further, the frequency range occupied by the subcarrier signal hopping is relatively narrow, the frequency usage efficiency can be improved. Further, the data transmission using the L area does not affect the high-speed data transmission in the H area. Therefore, also in the area H, the efficient data transmission can be performed.

When the data stored in the memory is transmitted, only warning signal for an abnormal condition (when it is necessary to transmit status change due to the abnormal condition continuously) is transmitted through the area L, and data which should be processed quickly may be transmitted through the area H. With this configuration, the efficient and fast data transmission is achieved.

Further, if it is difficult to continuously or periodically supply the electric power to the Tags (e.g., when Tags utilizes batteries), by selecting the area L, the low poser consumption can be achieved.

The subcarrier signal hopping frequency interval may be selected in accordance with the voltage of the power supply. For example, as shown in FIG. 23, power source voltage detectors 54 may be provided in the Tags 20–23, respectively, and the Tags 20–23 may operate in a low power consumption mode by narrowing the subcarrier hopping frequency if the voltage is lower than a predetermined value.

The communication system is configured such that only the signals of the narrow subcarrier hopping frequency interval area are received and demodulated (i.e., ID detection mode), and if the ID is received, the reception and demodulation of the signals in the wide subcarrier hopping frequency interval area is executed (i.e., data transmission mode). Corresponding to the above operation, each Tag may be configure to transmit the ID only in the L area where the subcarrier hopping frequency interval is narrow firstly. Then, after the each Tag receives the data transmission request from the Interrogator, the Tag may transmits the data using the H area which has a wide subcarrier hopping frequency interval. With such a configuration, it is sufficient that only the signals in the L area are detected by filtering and demodulating. Therefore, when the Interrogator operates in the ID recognition mode (which is normally used), load for filtering and demodulating can be reduced significantly. Further, the Tags can operate in the power save mode. This filtering can be performed using the band dividing filter which is a part of the demodulating system.

The signals in the L area is extracted by the filtering before the Fourier transformation is applied to reduce the data amount, the calculation amount of the Fourier transformation can be reduced. Further to the above, it may also be convenient if the amplifying band of the LNA is changed by switching the Q value of the tuning circuit or the like. Furthermore, by switching the band of the high frequency filters provided in front of and/or after the LNA, only the signals in the L area or the signals of L and H areas may be transmitted.

Further, by employing three areas, i.e., the L area corresponding to the narrow subcarrier signal hopping frequency interval, the H area corresponding to the wide hopping frequency interval and an M area which is the intermediate area between the L and H areas as shown in FIG. 22B, and one of the three areas may be selected in accordance with the condition of the power source, data amount and the like. For example, the M area may be normally used, the H area is used when the amount of transmission data is large, and the L area is used if the voltage of the battery is lowered with the lower data rate. Alternatively, the L area is normally used, the M area is used when the battery can be charged, and the H area is used if the power is constantly supplied from the power line such as the commercial power source. The area may be switched optionally in accordance with the data amount. Further alternatively, the L area may be used when the Tag operates with the battery, otherwise the M area is used, and further, the H area is used only when the data amount is large. When the H area is used, a notification may be transmitted before the area is switched. In such a case, the Interrogator normally receives only the L and M areas, which reduces the lord of the Interrogator with respect to the receiving, filtering and demodulating procedures.

As shown in FIG. 22C, in the L area where the subcarrier signal hopping frequency interval is relatively narrow, the band width of the subcarrier hopping is also narrow and thus a plurality of channels may be interfered simultaneously. In order to avoid such a situation, two areas L1 and L2 may be defined. The area L1 is normally used for subcarrier hopping. If the Interrogator receives the interference and is unable to receive the signal normally, the Interrogator transmits a switching signal requiring the Tag to switch the area from L1 to L2. In response to the switching signal from the Interrogator, the Tag executes the subcarrier hopping in the area L2. With such a configuration, the power consumption is saved, and anti-interference characteristic is improved.

It should be noted that the above-described second embodiment is an exemplary embodiment and various modification can be made. For example, although the subcarrier hopping pattern is defined in each area, the hopping pattern may expand both in the L and H areas. The communication system may be modified such that when the battery-driven Tags are used and/or the data rate is low (e.g., only the ID is transmitted), the modulation is applied only for the channels for which the hopping pattern is in the L area, and for the channels for which the hopping pattern is in the H area, modulation is not performed. With this control, the Tags which communicates mainly with the L area and the Tags which communicates mainly with the H area make use of the common subcarrier hopping pattern. Accordingly, the procedure of chronological reconfiguring of the frames performed in the Interrogator can be facilitated. Further, since the Tags are provided with the rest period, which contributes to the power save effect.

It should be noted that the subcarrier hopping is the technique which is not limited to the Tags using microwave band. Thus, such a modification can be employed in the wireless Tags using the 13.56 MHz or 125 kHz waves as the main carrier waves, whose antenna has a coil shape and exchange data in accordance with electromagnetic induction.

As described above, according to the embodiments, the Tag includes a receiving/reflecting system that receives the main carrier transmitted by the Interrogator and transmits the reflected signal to the Interrogator and a modulated subcarrier signal hopping system. The modulated subcarrier signal hopping system is provided with a frequency hopping system that applies frequency hopping to a subcarrier, and a subcarrier modulating system that modulates the subcarrier signal with a predetermined information signal.

The Tag further includes a main carrier modulating system that modulates the main carrier received through the receiving/reflecting system with the modulated subcarrier modulated by the subcarrier modulating system, the modulated main carrier being transmitted to the Interrogator through the receiving/reflecting system as the reflected signal.

According to the third embodiment, in the Tag configured as above, the frequency hopping system to capable of applying the frequency hopping to the subcarrier signal with a plurality of hopping frequency intervals, and the Tag further includes a hopping frequency interval selecting system that selects one of the plurality of hopping frequency intervals. Therefore, depending on the power supply condition, amount of data to be transmitted and the like, the power consumption can be reduced or the data transmission rate is increased, and thus the usage efficiency of the communication system is improved.

According to the third embodiment, the hopping frequency selecting system selects a hopping frequency interval that is narrower than a predetermined width in an area where the subcarrier signal has a low frequency, and the hopping frequency interval selecting system selects a hopping frequency interval that is wider than a predetermined width in an area where the subcarrier signal has a high frequency. Thus, the data transmission rate can be increased.

According to the third embodiment, the hopping frequency interval selecting system selects a predetermined hopping frequency interval from among a plurality of hopping frequency intervals based on an amount of data to be transmitted. Accordingly, the frequency usage efficiency is improved, the power consumption is reduced, and a high data rate area can be widened without being interfered by other frequencies.

According to the third embodiment, the hopping frequency interval selecting system selects a hopping frequency interval that is narrower than a predetermined width when a data rate of data to be transmitted is small, and the hopping frequency interval selecting system selects a hopping frequency interval that is wider than a predetermined width when a data rate of data to be transmitted is large. Accordingly, the frequency usage efficiency is improved, the power consumption is reduced, and a high data rate area can be widened without being interfered by other frequencies.

According to the third embodiment, the Tag further includes a power supply condition detecting system that detects a power supply condition. The hopping frequency interval selecting system then selects a hopping frequency interval based on the power supply condition detected by the power supply condition detecting system. With this configuration, a lower power consumption is achieved.

In particular, if the supplied power is lowered, an operation mode can be set to a power save mode by narrowing the subcarrier signal hopping frequency interval. That is, the hopping frequency interval selecting system selects a hopping frequency interval narrower than a predetermined interval if the power supply condition detecting system detects that the power supply condition is worse than a predetermined condition.

According to the third embodiment, the Tag further includes a hopping frequency interval control system that controls the hopping frequency interval selecting system to initially selects a hopping frequency interval narrower than a predetermined interval, the hopping frequency interval control system controlling the hopping frequency interval selecting system to select a hopping frequency interval wider than the predetermined interval if the Tag receives a data transmission request from the Interrogator. With this configuration, when an amount of data to be transmitted is relatively small, a load to the Interrogator, under stand-by state, steady-state or normal operation state, in terms of data reception, filtering and demodulation is significantly reduced. The power consumption of the Tags can also be reduced.

According to the third embodiment, the Interrogator includes a reflected signal receiving system that receives a reflected signal, each of the Tags generating the reflected signal by modulating the main carrier transmitted from the Interrogator and received by the Tags, a demodulating system that demodulates the reflected signal received by the reflected signal receiving system to output a demodulated signal, a data detection system that detects a data signal from the demodulating signal, a reception control system that controls the reflected signal receiving system to received a reflected signal modulated with a subcarrier signal having a hopping frequency interval narrower than a predetermined interval in a normal state, and an identification information Judging system that judges identification information of the Tag in accordance with the data signal detected by the data detection system. With this configuration, if the identification information judging system judges the identification information of the Tag, the reception control system controls the reflected signal receiving system to receive reflected signals modulated using the all ranges of hopping frequency intervals. With this configuration, when an amount of data to be transmitted is relatively small, a load to the Interrogator, under stand-by state, steady-state or normal operation state, in terms of data reception, filtering and demodulation is significantly reduced. The power consumption of the Tags can also be reduced.

Further, the Interrogator includes a reflected signal receiving system that receives a reflected signal, each of the Tags generating the reflected signal by modulating the main carrier transmitted from the Interrogator and received by the Tags, a demodulating system that demodulates the reflected signal received by the reflected signal receiving system to output a demodulated signal, a data detection system that detects a data signal from the demodulating signal, a demodulation control system that controls the demodulating system to demodulate a reflected signal modulated with a subcarrier signal having a hopping frequency interval narrower than a predetermined interval in a normal state, and an Identification information judging system that judges identification information of the Tag in accordance with the data signal detected by the data detection system. If the identification information judging system judges the identification information of the Tag, the demodulation control system controls the demodulating system to demodulate reflected signals modulated using the all ranges of hopping frequency intervals. Accordingly, with this configuration, when an amount of data to be transmitted is relatively small, a load to the Interrogator, under stand-by state, steady-state or normal operation state, in terms of data reception, filtering and demodulation is significantly reduced. The power consumption of the Tags can also be reduced.

The present disclosure relates to the subject matters contained in Japanese Patent Applications No. 2002-090121, and No. 2002-090428, both filed on Mar. 28, 2002, which are expressly incorporated herein by reference in their entireties.

What is claimed is:

1. A Tag for a wireless communication system including at least one Interrogator, the Interrogator transmitting a main carrier signal, said Tag transmitting a reflected signal to the Interrogator in response to reception of the main carrier signal, said Tag comprising:
  a receiving/reflecting system that receives the main carrier transmitted by the Interrogator and transmits the reflected signal to the Interrogator;
  a modulated subcarrier signal hopping system, which includes:
  a frequency hopping system that applies frequency hopping to a subcarrier signal to generate a frequency hopping subcarrier signal; and
  a subcarrier signal modulating system that modulates the frequency hopping subcarrier signal with a predetermined information signal;
  a main carrier modulating system that modulates the main carrier received through said receiving/reflecting system with the modulated frequency hopping subcarrier signal modulated by said subcarrier signal modulating system, the modulated main carrier being transmitted to the receiving/reflecting system, the receiving/reflecting system transmitting said modulated main carrier as the reflected signal to the Interrogator.

2. The Tag according to claim 1, wherein a minimum frequency of the subcarrier signal is greater than a hopping frequency interval of the subcarrier signal hopped by said frequency hopping system.

3. The Tag according to claim 1, an interval of a plurality of main carrier signals that are transmitted by the at least one Interrogator is greater than twice a maximum hopping frequency of the subcarrier signal hopped by said frequency hopping system.

4. The Tag according to claim 1,
  wherein all the frequency band of frequency-hopped subcarrier signals used for modulating a first main carrier signal and all the frequency band of frequency-hopped subcarrier signals used for modulating a second main carrier are at least partially overlapped, and
  wherein each of the frequency-hopped subcarrier signals used for modulating the first main carrier signal and each of the frequency-hopped subcarrier signals used for modulating the second main carrier are frequency-arranged in accordance with an interleaving relationship.

5. The Tag according to claim 1, wherein an interval of a plurality of main carrier signals transmitted by the at least one Interrogator is a sum of a maximum hopping frequency of frequency-hopped subcarrier signals and a minimum hopping frequency of the frequency-hopped subcarrier signals and a half of an interval of hopping frequencies of the subcarrier signals hopped by the frequency hopping system.

6. The Tag according to claim 1,
  wherein a primary side band generated by modulating a first main carrier signal with the subcarrier signal and a secondary side band generated by modulating a second main carrier signal with the subcarrier signal do not collide with each other, and
  wherein a minimum hopping frequency, a maximum hopping frequency and a hopping frequency interval of the subcarrier signals which is frequency-hopped by said frequency hopping system, and a frequency interval of first and second main carriers of the at least one Interrogator are determined such that the primary side band, the secondary side band and a side band generated by the first and second main carrier signals do not collide with each other.

7. The Tag according to claim 1, wherein an interval between a plurality of main carrier signals transmitted by the at least one Interrogator is equal to maximum hopping frequency and minimum hopping frequency of the frequency-hopped subcarrier signals frequency-hopped by said frequency hopping system, one of hopping patterns which are chronologically symmetric being used for frequency hopping.

8. The Tag according to claim 1, further comprising:
  a hopping pattern determining system that determines a hopping pattern for the subcarrier signal in accordance with identification information of the Interrogator; and
  a starting phase determining system that determines a starting phase of the hopping to be used for frequency hopping the subcarrier signal in accordance with the identification information of the Interrogator.

9. The Tag according to claim 1, further, comprising:
a numerical control oscillator used to apply the frequency hopping to the subcarrier signal; and
a subcarrier signal modulator that varies one of phase, frequency and amplitude of a signal generated by said numerical control oscillator in accordance with a predetermined information signal.

10. The Tag according to claim 1,
wherein said frequency hopping system is capable of applying the frequency hopping to the subcarrier signal with a plurality of hopping frequency intervals, and
wherein said Tag further includes a hopping frequency interval selecting system that selects one of the plurality of hopping frequency intervals.

11. The Tag according to claim 10,
wherein said hopping frequency selecting system selects a hopping frequency interval that is narrower than a predetermined width in an area where the subcarrier signal has a low frequency, and
wherein said hopping frequency interval selecting system selects a hopping frequency interval that is wider than a predetermined width in an area where the subcarrier signal has a high frequency.

12. The Tag according to claim 10, wherein said hopping frequency interval selecting system selects a predetermined hopping frequency interval from among a plurality of hopping frequency intervals based on an amount of data to be transmitted.

13. The Tag according to claim 10,
wherein said hopping frequency interval selecting system selects a hopping frequency interval that is narrower than a predetermined width when a data rate of data to be transmitted is small, and
wherein said hopping frequency interval selecting system selects a hopping frequency interval that is wider than a predetermined width when a data rate of data to be transmitted is high.

14. The Tag according to claim 10, further comprising a power supply condition detecting system that detects a power supply condition to said Tag, wherein said hopping frequency interval selecting system selects a hopping frequency interval based on the power supply condition detected by said power supply condition detecting system.

15. The Tag according to claim 10, further comprising a power supply condition detecting system that detects a power supply condition to said Tag, wherein said hopping frequency interval selecting system selects a hopping frequency interval narrower than a predetermined interval if said power supply condition detecting system detects that the power supply condition is worse than a predetermined condition.

16. The Tag according to claim 10, further including a hopping frequency interval control system that controls said hopping frequency interval selecting system to initially selects a hopping frequency interval narrower than a predetermined interval, said hopping frequency interval control system controlling said hopping frequency interval selecting system to select a hopping frequency interval wider than the predetermined interval if said Tag receives a data transmission request from the Interrogator.

17. An Interrogator for a wireless communicating system including at least one Interrogator and a plurality of Tags, the Interrogator transmitting a main carrier signal, each of the Tags transmitting a reflected signal to the Interrogator in response to reception of the main carrier signal, said Interrogator comprising:

a transmitting system that transmits the main carrier signal;
a reflected signal receiving system that receives a reflected signal, each of the Tags generating the reflected signal by modulating the main carrier transmitted from said Interrogator and received by the Tags;
a demodulating system that demodulates the reflected signal received by said reflected signal receiving system to output a demodulated signal; and
a data detection system that detects data from the demodulating signal,
wherein said demodulating system simultaneously receives signals within a predetermined band including all the hopping frequency ranges defined by minimum hopping frequency and maximum hopping frequency of a subcarrier signal and applies demodulation to the received signals,
wherein said data detection system includes:
a band dividing system that divides the demodulated signal into a plurality of bands to generate a divided band signal for each of the plurality of bands;
a decoding system that decodes the divided band signal to obtain data for each of the plurality of bands;
a sorting system that extracts frames from the divided band signals and sorts the extracted frames in accordance with a predetermined condition; and
a connecting system that connects the sorted frames chronologically.

18. The Interrogator according to claim 17, wherein said band dividing system includes:
A/D converting system that converts the demodulated signals into a series of digital values to obtain digital demodulated signals:
a frequency domain converting system that converts the digital demodulated signal into frequency domain signals;
a hopping band dividing system that divides the frequency domain signals by predetermined hopping frequency bands.

19. The Interrogator according to claim 18, wherein said demodulating system further includes a time domain converting system that applies an inverse conversion to the signals divided by the predetermined hopping frequency bands to obtain time domain signals.

20. The Interrogator according to claim 17, further including:
a collision detector that detects a collision as a plurality of Tags reply using the same subcarrier frequency;
a collision subcarrier signal notifying system that notifies the frequency of the subcarrier signal causing the collision if the collision detector detects the collision.

21. In combination, an Interrogator and a plurality of Tag for a wireless communicating, the Interrogator transmitting a main carrier signal, each of said Tags transmitting a reflected signal to said Interrogator in response to reception of the main carrier signal,
said Tag comprising:
a receiving/reflecting system that receives the main carrier transmitted by the Interrogator and transmits the reflected signal to the Interrogator;
a modulated subcarrier signal hopping system, which includes:
a frequency hopping system that applies frequency hopping to a subcarrier signal; and
a subcarrier signal modulating system that modulates the subcarrier signal with a predetermined Information signal;

a main carrier modulating system that modulates the main carrier received through said receiving/reflecting system with the modulated subcarrier signal modulated by said subcarrier signal modulating system, the modulated main carrier being transmitted to the Interrogator through said receiving/reflecting system as the reflected signal, wherein said frequency hopping system is capable of applying the frequency hopping to the subcarrier signal with a plurality of hopping frequency intervals, and wherein said Tag further includes a hopping frequency interval selecting system that selects one of the plurality of hopping frequency intervals, said Interrogator comprising:

a reflected signal receiving system that receives a reflected signal, each of the Tags generating the reflected signal by modulating the main carrier transmitted from said Interrogator and received by the Tags;

a demodulating system that demodulates the reflected signal received by said reflected signal receiving system to output a demodulated signal;

a data detection system that detects a data signal from the demodulating signal;

a reception control system that controls said reflected signal receiving system to received a reflected signal modulated with a subcarrier signal having a hopping frequency interval narrower than a predetermined interval in a normal state; and an identification information judging system that judges identification information of the Tag in accordance with the data signal detected by said data detection system, wherein, if said identification information judging system judges the identification information of said Tag, said reception control system controls said reflected signal receiving system to receive reflected signals modulated using the all ranges of hopping frequency intervals.

22. In combination, an Interrogator and a plurality of Tag for a wireless communicating, the Interrogator transmitting a main carrier signal, each of said Tags transmitting a reflected signal to said Interrogator in response to reception of the main carrier signal, said Tag comprising:

a receiving/reflecting system that receives the main carrier transmitted by the Interrogator and transmits the reflected signal to the Interrogator;

a modulated subcarrier signal hopping system, which includes:

a frequency hopping system that applies frequency hopping to a subcarrier signal; and a subcarrier signal modulating system that modulates the subcarrier signal with a predetermined information signal;

a main carrier modulating system that modulates the main carrier received through said receiving/reflecting system with the modulated subcarrier signal modulated by said subcarrier signal modulating system, the modulated main carrier being transmitted to the Interrogator through said receiving/reflecting system as the reflected signal, wherein said frequency hopping system is capable of applying the frequency hopping to the subcarrier signal with a plurality of hopping frequency intervals, and wherein said Tag further includes a hopping frequency interval selecting system that selects one of the plurality of hopping frequency intervals, said Interrogator comprising:

a reflected signal receiving system that receives a reflected signal, each of the Tags generating the reflected signal by modulating the main carrier transmitted from said Interrogator and received by the Tags;

a demodulating system that demodulates the reflected signal received by said reflected signal receiving system to output a demodulated signal;

a data detection system that detects a data signal from the demodulating signal;

a demodulation control system that controls said demodulating system to demodulate a reflected signal modulated with a subcarrier signal having a hopping frequency interval narrower than a predetermined interval in a normal state; and an identification information judging system that judges identification information of the Tag in accordance with the data signal detected by said data detection system, wherein, if said identification information judging system judges the identification information of said Tag, said demodulation control system controls said demodulating system to demodulate reflected signals modulated using the all ranges of hopping frequency intervals.

* * * * *